United States Patent [19]
Simpson et al.

[11] Patent Number: 5,537,320
[45] Date of Patent: Jul. 16, 1996

[54] METHOD AND APPARATUS FOR IDENTIFYING FAULT CURVES IN SEISMIC DATA

[75] Inventors: Anne L. Simpson; Robert E. Howard, both of Houston, Tex.

[73] Assignee: Landmark Graphics Corporation, Houston, Tex.

[21] Appl. No.: 331,811

[22] Filed: Oct. 31, 1994

[51] Int. Cl.$^6$ ........................................ G06F 19/00
[52] U.S. Cl. ............................................. 364/421
[58] Field of Search ................. 364/421; 395/929; 367/53, 72, 73

[56] References Cited

U.S. PATENT DOCUMENTS

| | | |
|---|---|---|
| 3,352,375 | 3/1963 | Krey . |
| 3,433,321 | 1/1967 | Borges . |
| 4,672,545 | 6/1987 | Lin et al. ........................... 364/421 |
| 4,800,539 | 1/1989 | Corn et al. . |
| 4,894,809 | 1/1990 | Moeckel .............................. 367/57 |
| 5,056,066 | 10/1991 | Howard .............................. 364/421 |
| 5,153,858 | 10/1992 | Hildebrand ......................... 367/72 |
| 5,189,643 | 2/1993 | Wang et al. . |

OTHER PUBLICATIONS

An Outline of Structural Geology, Bruce E. Hobbs, Winthorp D. Means & Paul F. Williams, John Wiley & Sons, Inc.

Primary Examiner—Donald E. McElheny, Jr.
Attorney, Agent, or Firm—Bush, Moseley, Riddle & Jackson

[57] ABSTRACT

A method and apparatus including a programmed computer for carrying out the method is disclosed for identifying valid fault curves on a vertical seismic section, which typically is one vertical seismic section of a three dimensional volume of seismic data. A method for automatically picking or snapping two user seed nodes to valid nodes of a valid fault curve is provided. The invention includes a process for extending a two node valid fault curve in a vertical section upwards and downwards throughout such section. A method of translating a fault curve found in one section to another parallel and vertical section and to all other desired vertical sections of the volume is also disclosed.

24 Claims, 19 Drawing Sheets

$\Delta X = (S''-S)(STRIKE\ STEPOUT\ ON\ S)$

SECTION Y=100

SECTION Y=90

METHOD AND APPARATUS FOR IDENTIFYING FAULT CURVES IN SEISMIC DATA

BACKGROUND OF THE INVENTION

1. Field of the Invention

The method of this invention relates generally to the field of computer aided exploration for hydrocarbons using seismic data of the earth. In particular, the invention concerns a computerized method and apparatus including a programmed computer for identifying valid fault curves on vertical seismic sections of a three dimensional volume of seismic data.

2. Description of Prior Art

Because faulting of stratigraphic subterranean formations creates hydrocarbon traps and flow channels, accurate identification of fault curves and fault surfaces is essential to the interpretation of most seismic data volumes. Explorationists today use an interactive workstation on which is displayed sections of seismic data. A fault surface is characterized by a series of fault curves, each one representing the intersection of a fault surface with a particular vertical seismic section.

With existing workstation tools (e.g., existing interactive computer programs), the interpretation of faults is tedious and limited. For a particular vertical section, the workstation operator must carefully move a cursor over the entire length of an observed fault curve, pausing to click at points along the curve enough times so that connecting the points by straight line segments satisfactorily represents the entire curve. Then, this process must be repeated for each section on which the fault curve is desired, perhaps hundreds of sections.

3. Identification of Objects of the Invention

A primary object of the invention described herein is to provide a method and apparatus for automatically producing a "valid fault curve" on a vertical seismic section from user supplied information of as few as two coordinates of the fault, i.e., coordinates of two points along or near the curve on that section. A valid fault curve is a succession of points distributed along a fault event as identified by the invention, in the seismic data, so that connecting the points consecutively by straight line segments produces a continuous curve, known as a "polyline", describing the fault. The word "valid" is generally used herein to characterize the existence of a fault curve which has been validated by the invention from evidence in the seismic data.

Another object of the invention is to provide a method of automatically translating a valid fault curve from the vertical seismic section to a second seismic section in a three dimensional volume of seismic data.

Still another object of the invention is to provide a method for automatically producing valid fault curves on all desired vertical seismic sections from user supplied information of as few as two coordinates of the fault on just one of the sections.

SUMMARY OF THE INVENTION

The objects identified above, as well as other advantages and features of the invention are provided in a method, preferably implemented as apparatus including a method of a computer program in an interactive computerized workstation used by explorationists for oil and gas or other minerals. The workstation includes a memory with a database comprising a three dimensional volume of seismic data representative of reflections from subterranean stratigraphic formations. A selected vertical section of such data is displayed on a CRT screen (that is, monitor) of the workstation. A user moves a cursor on the display and "clicks" a pointing device (commonly called a "mouse") to cause the horizontal and vertical coordinates of the cursor to be read into the computer.

According to a first aspect of the invention a method and computer program which implements such method automatically produces a valid fault curve on a vertical seismic section from user supplied information of as few as two coordinates of the fault, e.g. coordinates of two points along the fault curve of that section.

Defining a Seed Fault

On the display, the explorationist user recognizes a valid fault curve created by a fault surface intersecting the selected vertical plane. A typical fault curve is approximately vertical and relatively smooth. At two or more relatively closely-spaced positions along such curve, the user clicks the mouse to create inputs to the computer program comprising the coordinates of such clicks. The points described by these coordinates, or "nodes", lie on or about the valid fault curve, and define a "seed fault" of one segment for the method. The seed fault may also be a seed polyline curve, with a number of segments being one less than the number of nodes.

"Snapping" the Seed Fault to the Valid Fault

The invention includes first finding a valid fault in the close vicinity of the given seed fault and then replacing the seed fault by the valid fault. This aspect of the invention may be described as "snapping" the seed fault to a valid fault, because if such process is displayed graphically, the seed fault appears to jump or "snap" horizontally to become the valid fault. Such snapping is performed on a node-by-node basis.

For the moment assume that the user provides only two nodes in the seed fault: a "top seed node" closer to the top of the displayed section on the monitor and a "bottom seed node" closer to the bottom of the displayed section. According to the invention, a straight "seed dip-line" is defined which passes through these two nodes.

Next, the top seed node is "snapped" to the "valid top node". This is done by first providing a plurality of "trial top nodes" on each side of the top seed node along a horizontal line which passes through the top seed node and which is within a specified horizontal window around that node. All the trial nodes have the same vertical coordinate as the top seed node and are provided with a dip-line parallel to the seed dip-line. The width of the horizontal window is a measure of uncertainty of the user's ability to correctly position the cursor on the valid faults.

For each trial top node a "fault attribute" value is determined. A fault attribute as defined for this invention is a quantity proportional to the probability that a valid fault curve exists at the trial node. It is determined from computations on the seismic data in the vicinity of the trial node and a predetermined vertical window of the dip-line through that node. The particular trial top node which has the highest fault attribute is designated as the "valid top node". According to the definition above, the top seed node is "snapped" to the valid top node. However, if such highest fault attribute does not meet a certain minimum standard, then the valid top node is considered "null", and failure is reported to the user.

Similarly, according to the invention, the bottom seed node is snapped to a "valid bottom node". A plurality of "trial bottom nodes" are provided on each side of the bottom seed node and within a specified horizontal window around that node. All such trial bottom nodes have the same vertical coordinate as the bottom seed node and are provided a dip-line parallel to the seed dip-line.

For each trial bottom node, a fault attribute value is determined using the seismic data in the vicinity of the trial node and dip-line through that node. The extent of each dip-line is constrained by the size of the predetermined vertical window about the bottom node. The particular trial bottom node which has the highest attribute is designated as the "valid bottom node". The bottom seed node has been "snapped" to the valid bottom node. However, if such highest attribute does not meet a certain minimum standard, then the valid bottom node is considered "null". Such failure to find the valid bottom node is reported to the user.

If both valid top and bottom nodes are non-null, the seed fault has been successfully "snapped" to the valid fault according to the invention. An average of the two highest attributes (one from the top node and the other from the bottom node) is determined also. Such average is recorded as the "strength" of the valid fault. From the valid top and bottom nodes, a valid dip-line is defined. Next, the valid fault is extended upwards and downwards in the seismic section.

Determination of Fault Attribute

The fault attribute quantity used to estimate fault probability may be different from situation to situation. Faults may exhibit various "signatures" of their existence on seismic sections; and different types of fault attribute quantities may be determined according to what kind of signature seems to be most strongly present in the particular data at hand. For example, one such signature can be low seismic data amplitude. For such a case, a root-mean-square (RMS) amplitude may be indicated. The calculated fault attribute for a node may be the maximum RMS amplitude of all trial nodes minus the RMS amplitude of each individual node. The node showing the greatest value of this attribute would be picked as the valid node.

Another such signature can be an up or down shift of the seismic pattern as the fault is crossed left to right. In this situation, the calculated fault attribute may be based on cross-correlating the pattern to the left of the dip-line with that to the right of the dip-line, where low cross-correlation suggests a high probability of a fault. Experience to date suggests that such fault attributes based on cross-correlation are preferred to those based on RMS amplitude.

Extending the Valid Fault Upwards

A "new top seed node" is created, according to the invention, as that point which is on the dip-line passing through the valid top node and which is a predetermined vertical distance above the valid top node. The new top seed node is then snapped to a "new valid top node", as described above. However, if the new top seed node is outside of the seismic data, or if snapping to the new valid top node fails, then extension upwards stops. Otherwise, a new valid dip-line is created passing through the valid top node and the new valid top node, and the method is repeated while attempting to extend the valid fault upwards to yet another node.

Extending the Valid Fault Downwards

A "new bottom seed node" is created as that point which is on the dip-line passing through the valid bottom node and which is a predetermined vertical distance below the valid bottom node. The new bottom seed node is snapped to a "new valid bottom node", as described above. However, if the new bottom seed node is outside of the seismic data, or if snapping to the new valid bottom node fails, then extension downwards stops. Otherwise, a new valid dip-line is created passing through the valid bottom node and the new valid bottom node, and the method is repeated while attempting to extend the valid fault downwards yet another node.

In the descriptions that follow, the two processes of extending the fault vertically may be included in the terminology of "snapping a seed fault to a valid fault". In other words, the term snapping refers to both the snapping of the nodes of the seed fault and the vertical extensions of the snapped nodes.

More Than Two Nodes on Seed Fault

When more than two nodes are present on the original seed fault, the method of the invention is modified so as to "snap" each of such nodes to a valid node before extending upwards and downwards. For an internal node (one which is not the lowest or the highest), the seed dip-line is taken to be the average of the two dip-lines to the neighboring nodes. If two vertically contiguous valid nodes are both null, failure is reported to the user. Otherwise the method finds the longest set of vertically contiguous valid nodes which are all non-null, and proceeds with upwards extension of the valid fault from the highest node of the set, and with downwards extension of the valid fault from the lowest node of the set.

Less Than Two Nodes on Seed Fault

The method and apparatus of the invention may also be adapted to cases where only one node on the seed fault is available. Two sub-cases are distinguished according to whether or not dip-line information is available from some other source. In either subcase a second node on the seed fault is estimated and then the method proceeds as described above for the case where two nodes are available.

Dip-line information may be provided directly by the user. For example such information may be provided in the form of the slope of the fault dip, expressed as a number of horizontal units (plus or minus) per vertical unit. A second node is determined by moving upwards (or downwards) from the given node by a standard distance and then moving leftwards (or rightwards) by an amount equal to the standard distance times the given slope.

If only one node is available on the seed fault and dip-line information is not available, then a second node may be found by various trial-and-error methods. For example, a movement upwards from the given node a standard distance can be made, and then a plurality of trial second nodes may be distributed to the left and right within some geologically reasonable horizontal window. In the notation used above such trial second nodes may be called "trial top seed nodes". The original given node may be called the "bottom seed node". Each combination of a trial top seed node and the bottom seed node may be called a "trial top seed nodes". The original given node may be called the "bottom seed node". Each combination of a trial top seed node and the bottom seed node may be called a "trial seed fault". Then an attempt is made to snap each trial seed fault to the valid fault by the method described above. The strengths of the valid faults found may then be recorded.

If none of the attempted snaps succeeds, then failure is reported to the user. Otherwise that particular valid fault having the greatest strength is selected and the associated trial second node is designated as the true second node. Such designation may also be improved by well-known interpolation techniques around the trial second node. For either case presented above, two trial nodes are determined and are available to use with the method as described above.

Translating the Valid Fault Curve to a Second Seismic Section

According to another aspect of the invention a method and apparatus including a computer program which implements such method is provided for automatically providing valid fault curves on all desired vertical seismic sections from user supplied information of as few as two coordinates of the fault on just one of the sections.

In order to find a valid fault curve on a second vertical seismic section parallel to the present (i.e., the "first") one just worked upon but at a number of section index units away from it, a valid fault curve is first translated to the new section. Such translated curve is used as the seed fault on the new section and the method proceeds as described above to attempt to snap the new seed fault to a new valid fault curve on the new section. In snapping the nodes of the new seed fault, a horizontal uncertainty window is provided around each node which is somewhat larger than that used on the first section. The larger window is provided because of uncertainty of the position of the fault curve at the new section. The translation is considered to fail if less than two vertically contiguous nodes fail to snap.

The translated fault curve is a copy of the first curve onto the new second section, but shifted horizontally right or left on the new second section according to an estimate of the "strike step-out" of the fault. The strike step-out is the number of index units of horizontal shift per each section index unit away from the present section. Multiplying the strike step-out by the number of section index units between the first seismic section and the second seismic section produces the shift distance to make in the translation. The sign of the step-out indicates whether the shift is to the right or to the left.

The estimate of strike step-out is obtained by first translating the valid fault curve to a closest possible "neighbor" section, one section index away, with no horizontal shift at all, i.e., on the assumption (usually false) that the step-out is zero. However, the horizontal uncertainty window on the neighbor section is widened by a small number of horizontal index units to accommodate the valid step-out, normally less than one horizontal index unit per section unit. The translated curve is then snapped to the valid fault curve on the neighboring section. The first and second valid fault curves are then compared. All nodes which exist on both curves at the same vertical position are found. The average horizontal position of such nodes is computed separately for both the first and second curves. The second average horizontal position minus the first average horizontal position is used as an estimate of strike step-out.

Translating Valid Fault Curves to Subsequent Seismic Sections

Once a valid fault curve has been determined on the first and second seismic sections, the method is repeated in order to continue such translations throughout the seismic volume, or at least until the translation fails, either in a positive section index direction or a negative section index direction. The strike step-out is re-estimated for every translation, because fault strike directions are known to change.

The strike step-out estimation for subsequent seismic sections is slightly modified from that involved in the first translation. The fault curves from two seismic sections are compared. Again, all nodes which exist on both curves at the same vertical position are found. The average horizontal position of such nodes is computed separately for both the two curves. The difference between such two horizontal positions, divided by the section index difference between the two sections, is then used as the estimate of strike step-out.

BRIEF DESCRIPTION OF THE DRAWINGS

The objects, advantages and features of the invention will become more apparent by reference to the drawings which are appended hereto and wherein like numbers indicate like elements and wherein an illustrative embodiment of the invention is shown, of which:

FIG. 3C), but showing a seed fault applied to the section and a snapped fault which has been expanded up and down in the section;

DESCRIPTION OF THE PREFERRED EMBODIMENT OF THE INVENTION

Figure 1:
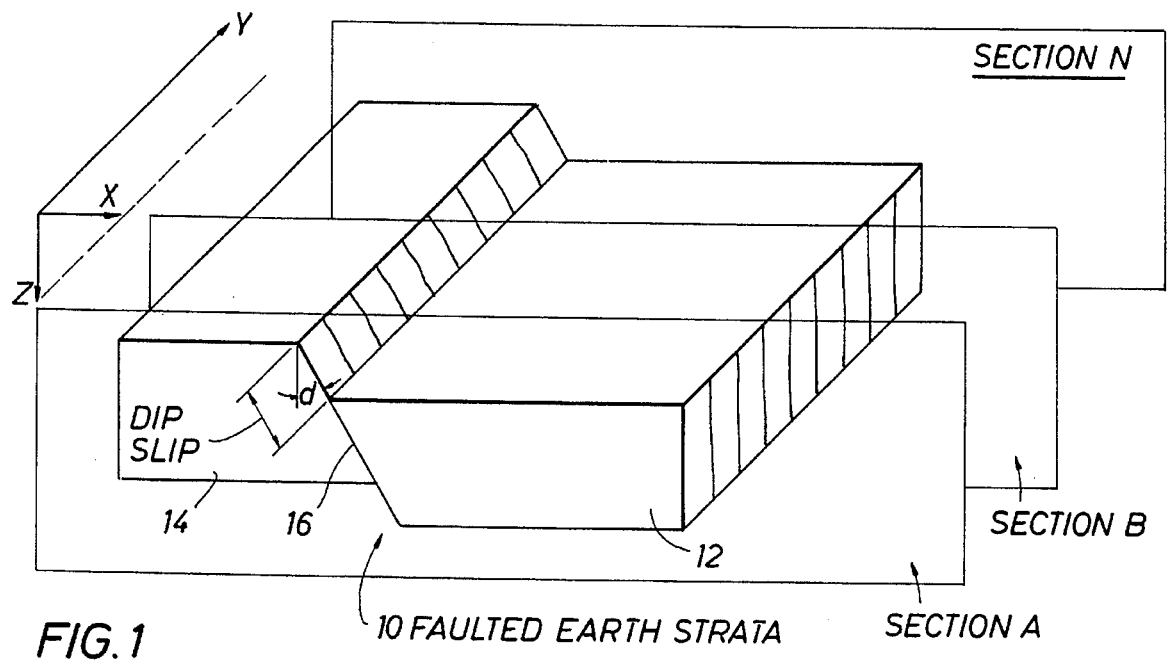
FIG. 1 is an illustration of a faulted earth strata showing a simple normal dip slip fault and showing vertical sections or slices taken through the volume of the earth which may be taken to visualize the stratigraphic characteristics of the earth.

FIG. 1 illustrates a simple fault of a geological formation 10 of the earth. A portion 12 of the formation has slipped along a fault surface 16 at an angle α (90° minus the dip angle) with respect to the z coordinate as shown. An x-y-z cartesian coordinate system is arbitrarily shown, with the z axis pointing into the earth, and x and y axes provided as shown. In this illustration, the x axis is oriented generally at right angles to the fault surface. However, this invention is not limited to such an orientation of x and y axes, and in fact, by computer manipulation, the x and y axes of a vertical section may be rotated about the z axis for different views of the strata of the earth with different vertical sections intersecting the strata.

For illustration, three sections, A, B and N are shown, all of which cut across the fault surface 16, thereby creating a fault curve in each respective section.

Only a "normal" fault is illustrated here. But this invention is not limited to normal faults, and may be used where reverse faults, strike-slip faults, rotational faults and transform faults are encountered. The invention is also not limited to single faults of a vertical seismic section. It may be used for multiple faults. For ease of explanation and illustration, only simple x-z seismic sections are illustrated with a simple normal fault. Each section may be identified by its Y position, or its Section Index numbers.

Figure 2:
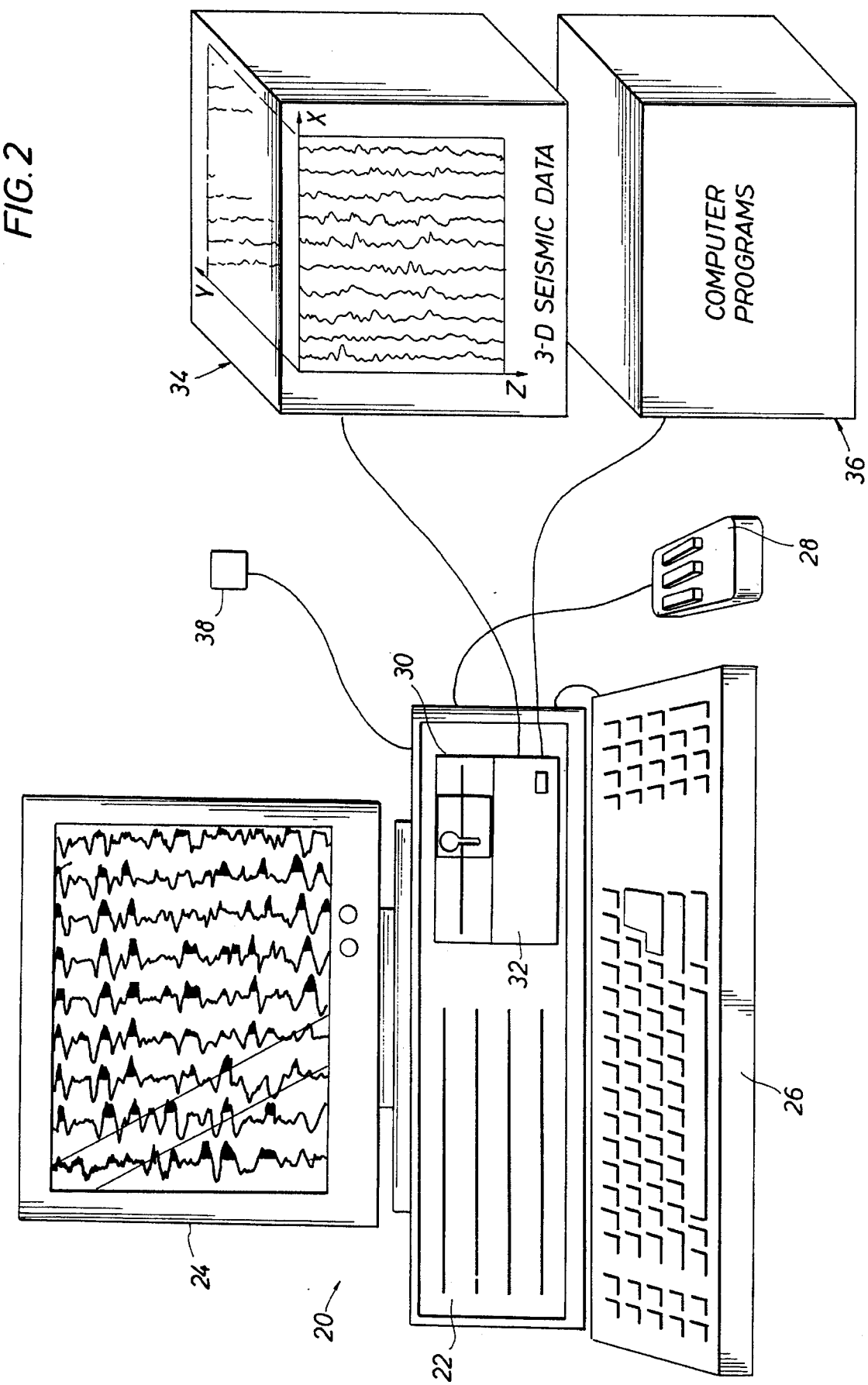
FIG. 2 is a schematic illustration of a computer workstation having 3-D seismic data stored in memory, where the computer is controlled by computer programs which embody the methods of the invention.

FIG. 2 is an illustration of a workstation 20 which typically includes a CPU 22, a CRT or monitor 24, and input devices such as a keyboard 26, pointing device or "mouse 28 and floppy disk drive 30. A mass memory 32 in the form of a disk drive 32 may be provided as indicated in FIG. 2, or such disk drive may be an external disk drive capable of storing massive amounts of 3-D Seismic Data, schematically illustrated as Seismic Data Cube 34, and computer programs 36, which, when controlling the workstation 20, perform the methods of this invention. Computer programs 36 are described below with reference to the flow charts of the Figures. The workstation 20 includes output devices, including monitor 24 and one or more printers, plotters, etc., schematically indicated by reference number 38.

FIGS. 3A, 3B, 3C and 3D show four vertical sections of real seismic data of a 3-D Seismic Data Cube 34 taken at section indexes S=Y=80, 90, 100, 110 respectively. Any one of such sections may be displayed on monitor 24 of workstation 20 by means of conventional 3-D interactive computer techniques. Such a section is representative of the presentation on CRT 24 encountered by a geological or geophysical specialist in his or her work with seismic data. About one-quarter of the way in from the left edge of each of these vertical seismic sections, a strong fault exhibits changes of the seismic pattern from the left side to the right side. Other faults exist with somewhat less strength and consistency from section to section. The methods and apparatus of this invention enable an explorationist or user of the workstation 20 to automatically determine fault lines in such data.

Figure 3A:
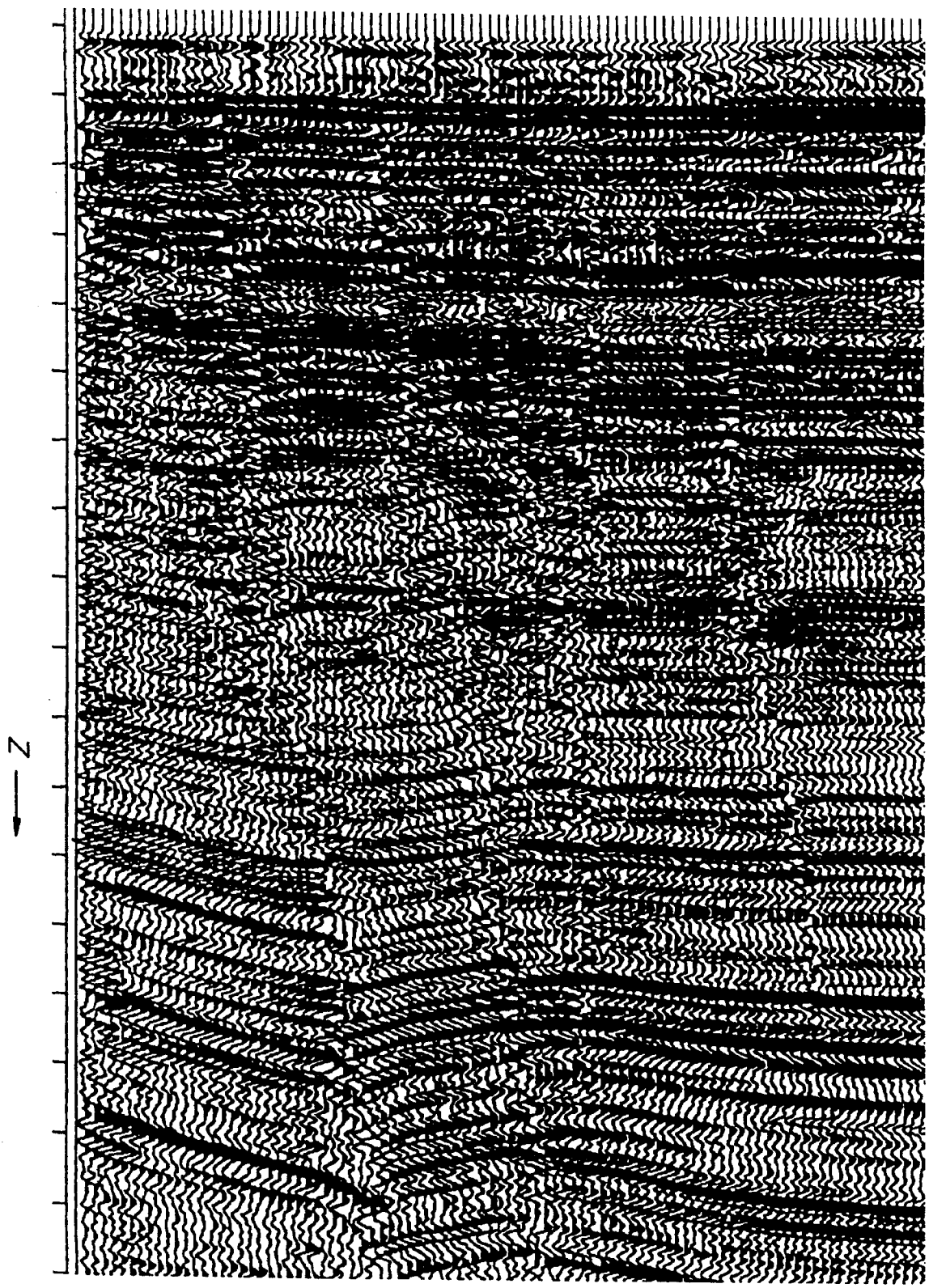
FIGS. 3A, 3B, 3C and 3D are four vertical x versus z sections taken at S=Y=80, 90, 110, 110 respectively of a three dimensional volume of actual seismic data.
Figure 3B:
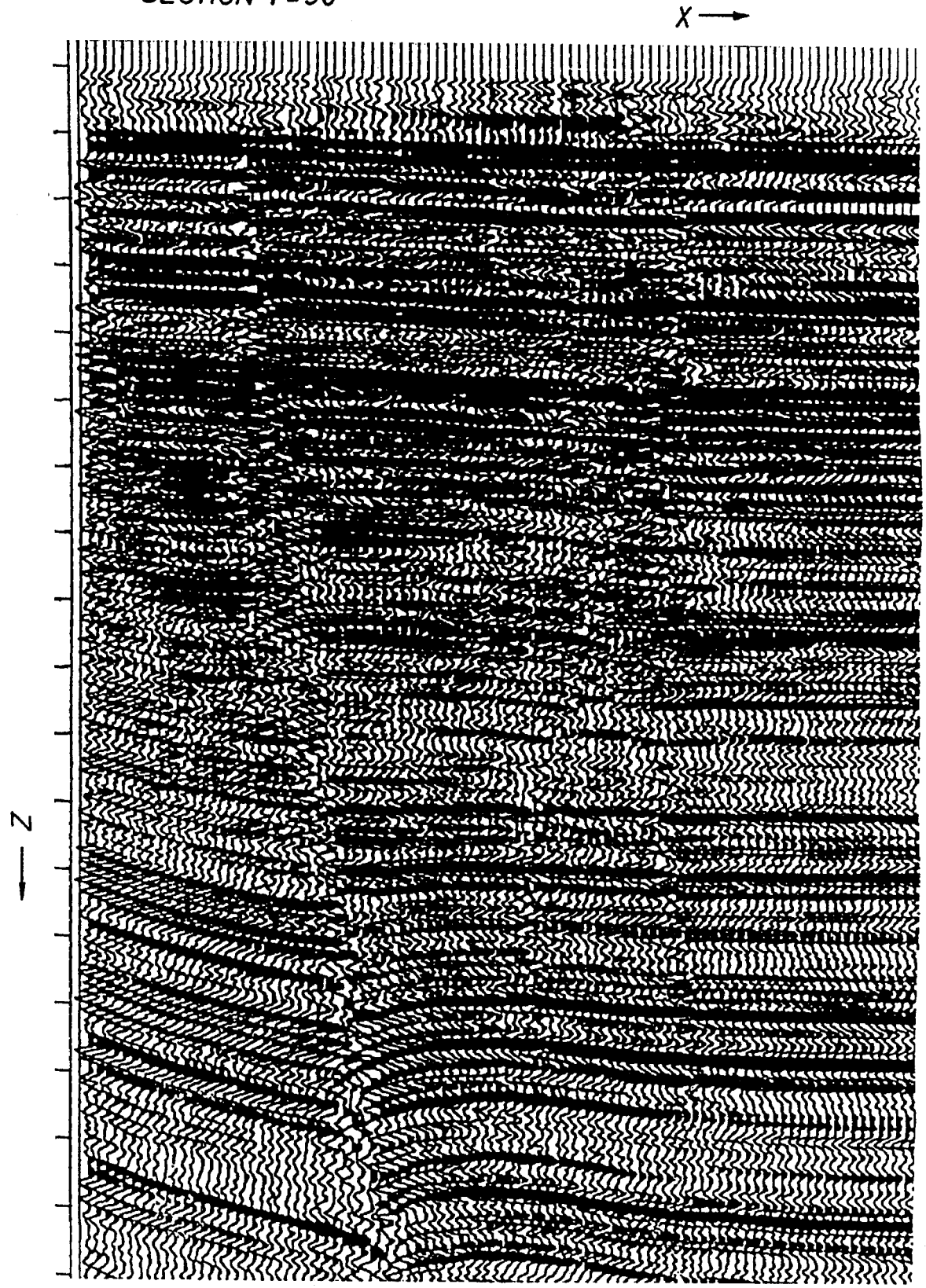
Figure 3C:
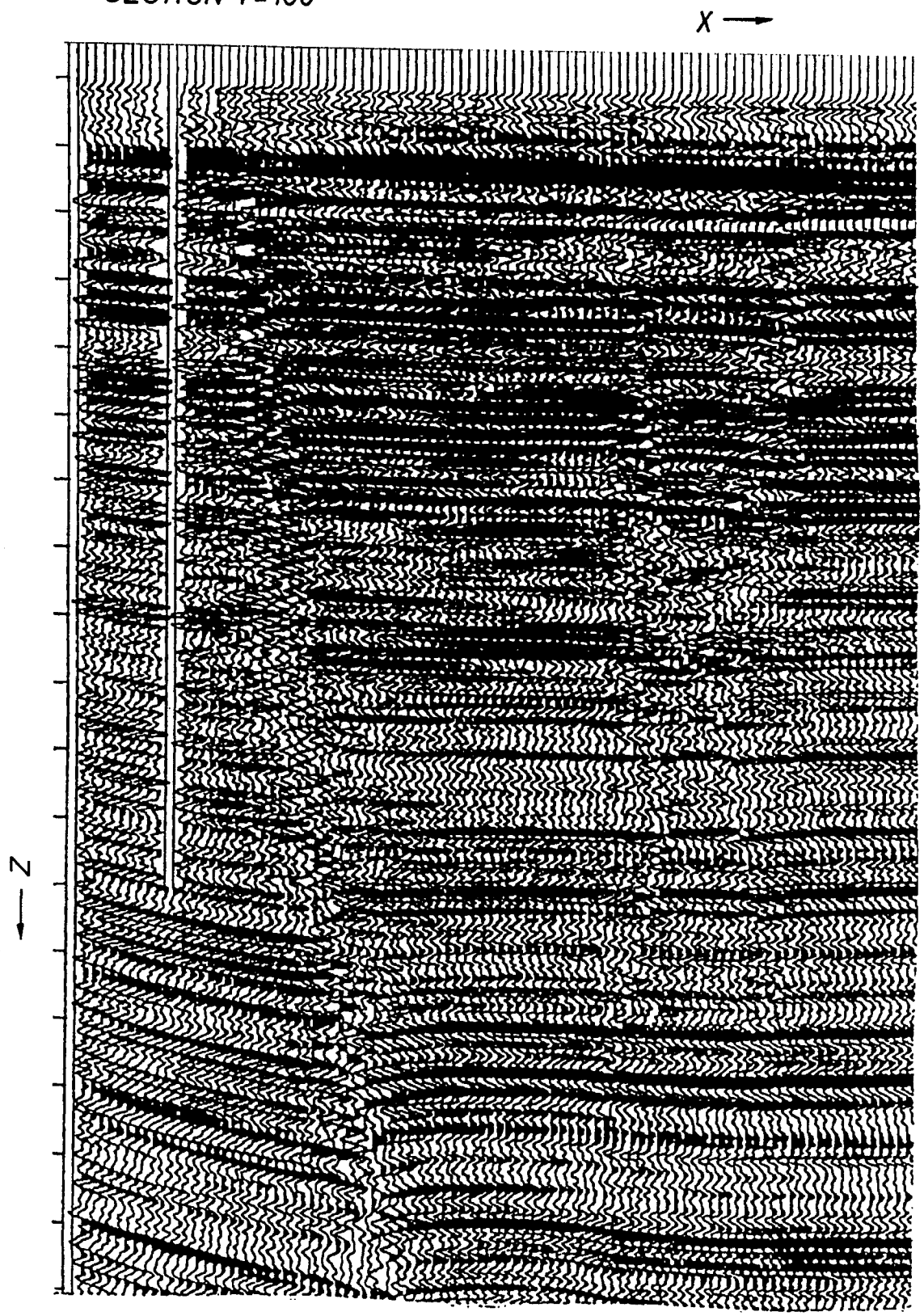
Figure 3D:
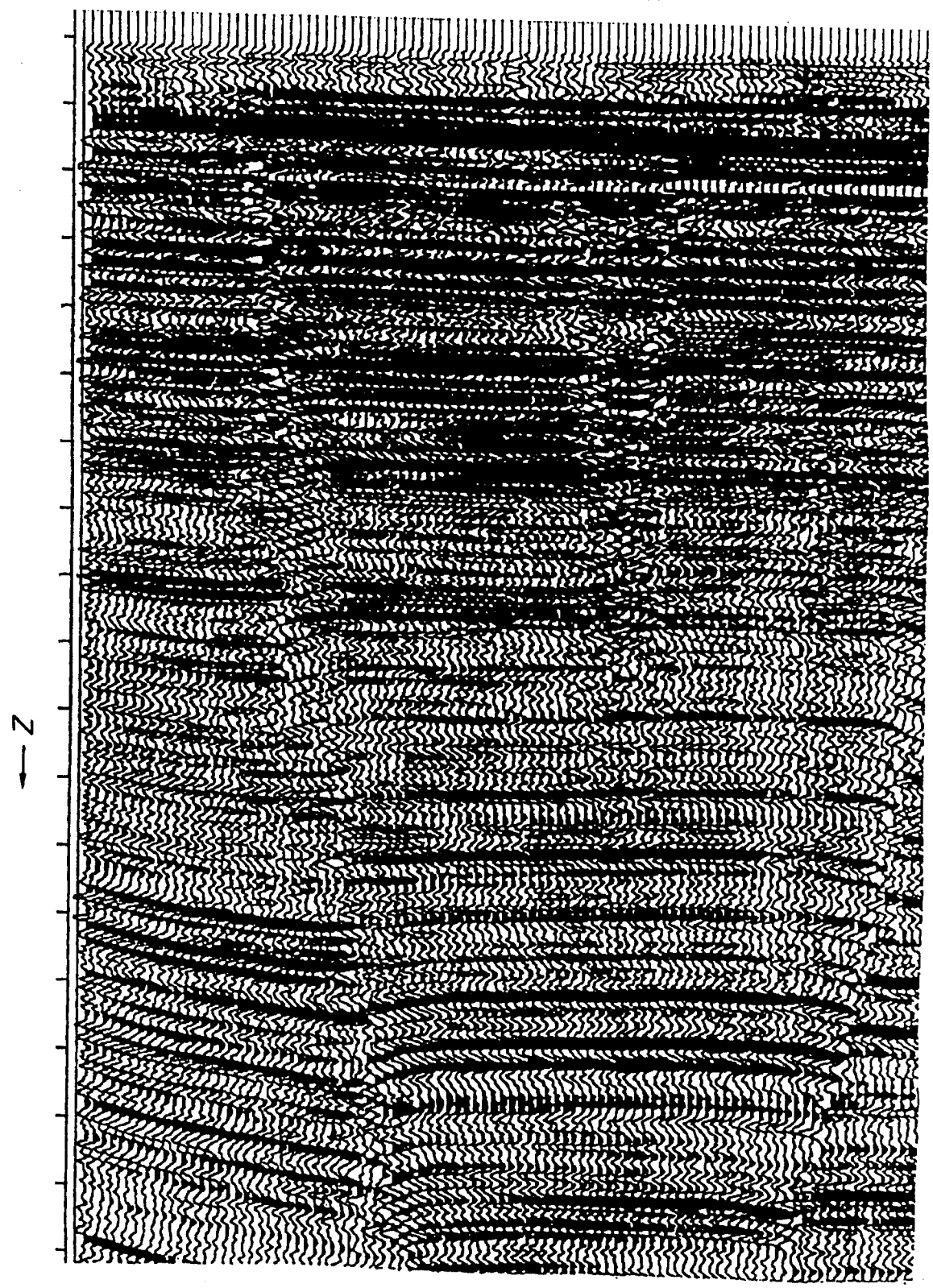
Figure 4:
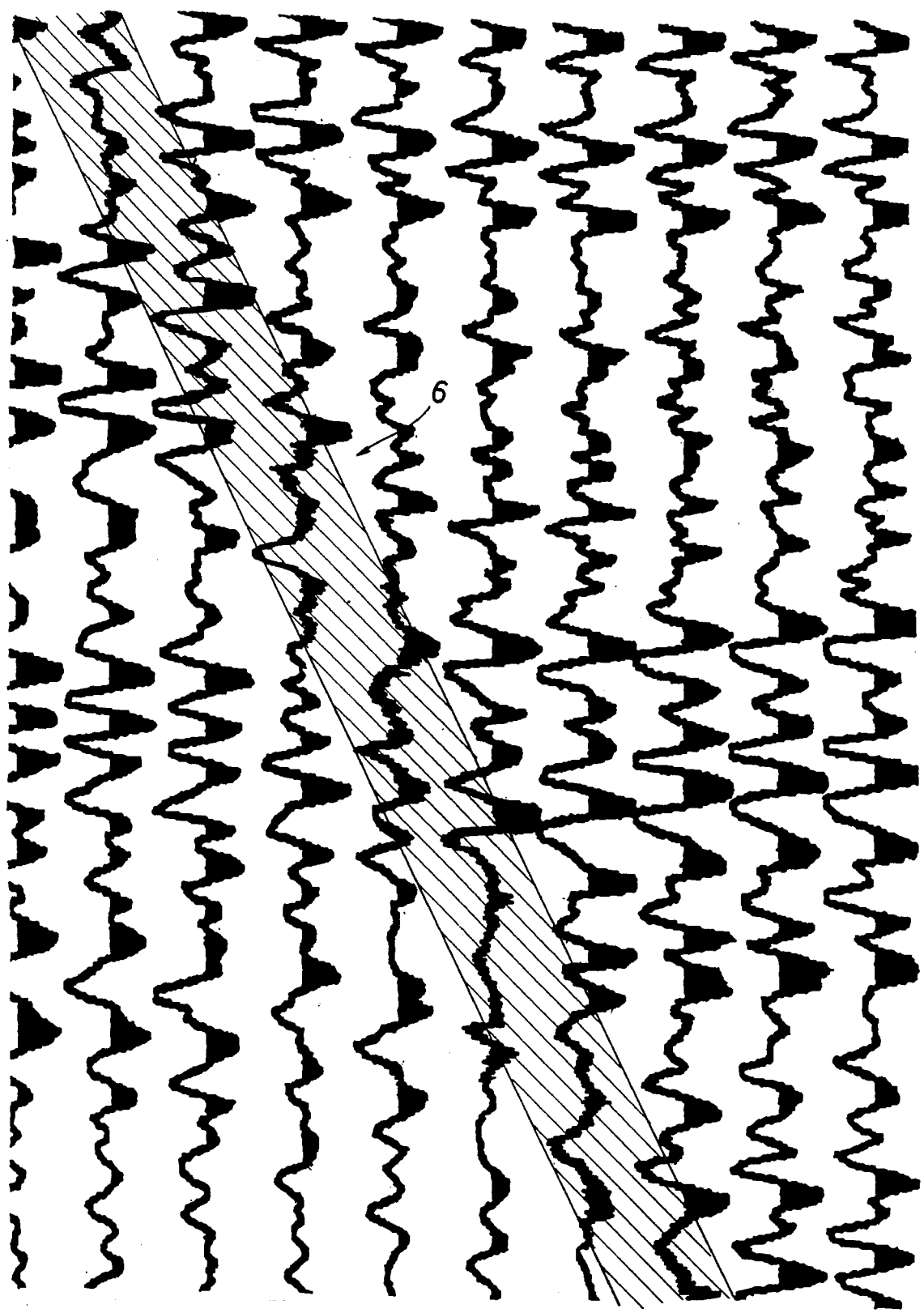
FIG. 4 is a greatly enlarged portion of the section of FIG. 3B showing ten separate adjacent seismic traces in the vicinity of a fault.

FIG. 4 is a greatly enlarged portion of FIG. 3B (the Y=90 section) showing ten separate adjacent seismic traces in the vicinity of a strong fault 6. The fault zone is seen to be somewhat diffuse, involving a transition over several traces.

Figure 5:
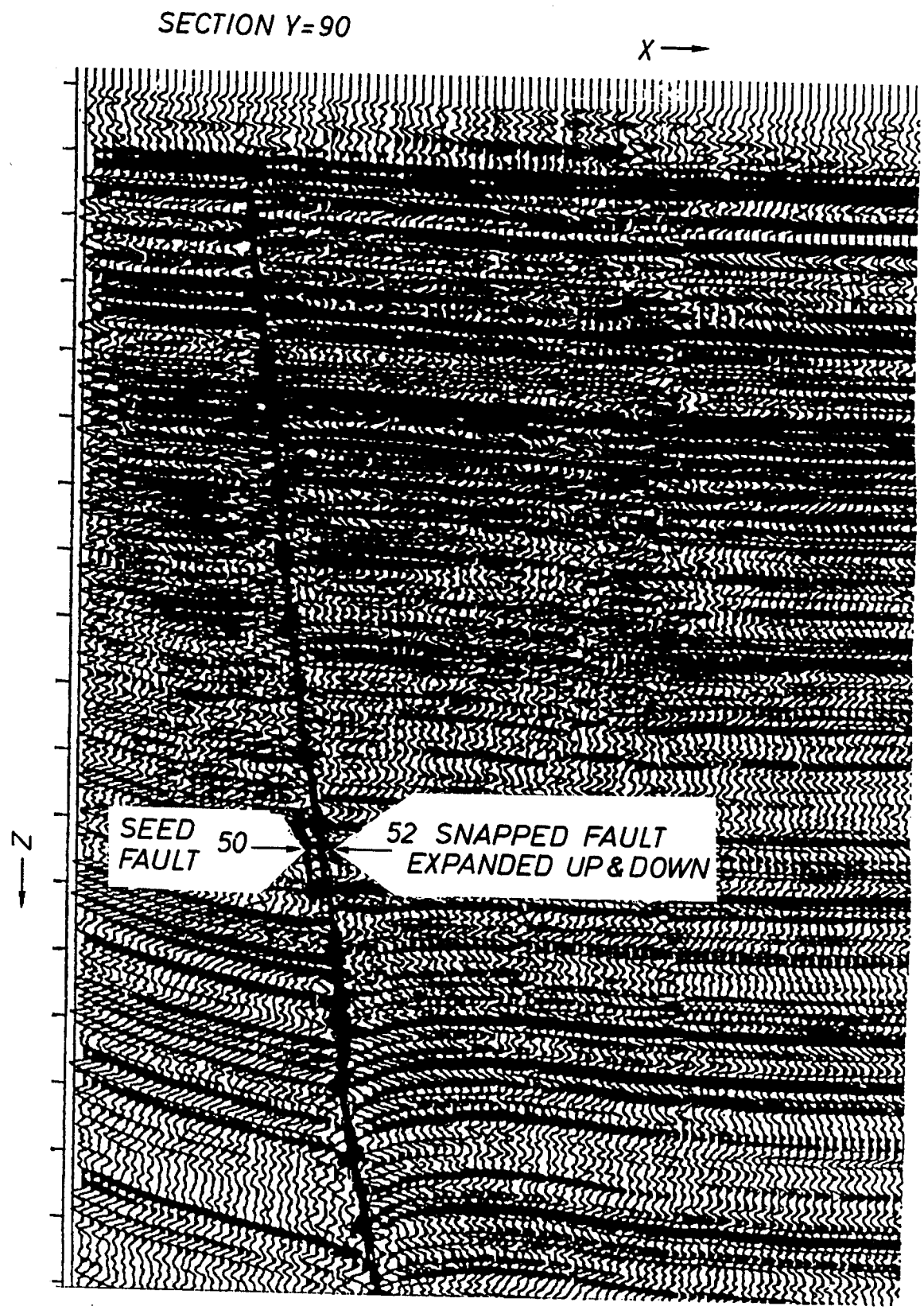
FIG. 5 is an illustration of the seismic section at Y=90 (e.g.

Description of Method for Snapping a Seed Fault on a Seismic Section to a Valid Fault FIG. 5 is a reproduction of FIG. 3B on which a sample "seed fault" 50 is drawn. The seed fault 50 is a simple line of only two nodes, which the user has created using cursor movements controlled by a pointing device or "mouse". A valid fault is illustrated which has been created by the method and apparatus of this invention which snaps the seed fault to the snapped or valid fault 52. The valid fault 52 has been extended upwards and downwards as determined by the data.

The fault curve is approximately vertical and relatively smooth. The user clicks his or her mouse where a cursor pointer points to two or more relatively closely-spaced positions along the curve that he or she recognizes as a fault curve. The clicks create inputs to the computer program described below comprising the coordinates of such clicks. The points described by such coordinates lie on or about the valid fault curve. Such points are called "nodes" herein. The line (or multi-line segments) defined by such input clicks or nodes defines a "seed fault" according to the terminology of this specification.

The determination of the location of a valid fault 52 in the close vicinity of the given seed fault 52 and replacement of the seed fault 50 by the valid fault 52 is the starting process of the invention. This starting process may be described as "snapping" the seed fault to a valid fault, because if the process is displayed graphically, the seed fault 50 appears to jump horizontally to become the valid fault 52. Such snapping is performed on a node-by-node basis.

For the moment assume that only two nodes define the seed fault: a "top seed node" closer to the top of the monitor and a "bottom seed node" closer to the bottom of the displayed section. A straight "seed dip-line" passing through these two nodes, is defined.

The top seed node is then snapped to the "valid top node". First, a plurality of "trial top nodes" is provided horizontally along each side of the top seed node and within a specified horizontal search window around that node. All such trial nodes have the same vertical coordinate as the top seed node. A dip-line parallel to the seed dip-line is provided. The width of the search window is a measure of uncertainty in the user's ability to correctly position the cursor on the valid fault. The height of such window is taken as a predetermined number of depth units, e.g. fifty units in the z direction, typically twenty five units above and below the seed node.

For each trial top node a "fault attribute" value is determined. A fault attribute, for the purpose of this specification, is a quantity proportional to the probability (or in the "nature" of probability number) that a valid fault curve exists at the trial node. It is determined from the seismic data in the vicinity of the trial node and dip-line through that node. The particular trial top node which has highest fault attribute is designated as the "valid top node". According to the invention, the top seed node has "snapped" to the valid top node. However, if such highest fault attribute does not meet a certain minimum standard, then the valid top node is considered "null", and failure is reported to the user.

Similarly the bottom seed node is "snapped" to a "valid bottom node". A plurality of "trial bottom nodes" is provided horizontally along each side of the bottom seed node and within a specified horizontal window around that node. All such trial nodes have the same vertical coordinate as the bottom seed node and provided with a dip-line parallel to the seed dip-line. The extent of the dip line is constrained by the height of the search window.

For each trial bottom node a fault attribute value is determined using computations on the seismic data in the vicinity of the trial node and dip-line through that node. A fault attribute is defined as above. The particular trial bottom node which has a highest attribute is designated as the "valid bottom node", and the bottom seed node has been snapped to the valid bottom node. If such highest attribute does not meet a certain minimum standard then the valid bottom node is considered "null", and failure is reported to the user.

If both valid nodes are non-null, the seed fault has been successfully snapped to the valid fault. An average of the two highest attributes (one from the top node, the other from the bottom node) is recorded as the "strength" of the valid fault. From the two valid nodes a valid dip-line is defined and the valid fault is then extended upwards and downwards in the seismic section as described below.

A flow chart suitable for programming a digital computer according to the methods of the invention is attached as FIGS. 6, 7, 8, 10, 12, 13, 14, and 17 illustrating flow charts A through H respectively. Each flow chart describes part of the method of the invention and is tied to other flow charts by conventional references. Within each chart individual logic determinations are isolated within rectangular boxes. Such logic boxes are numerically sub-labelled, e.g. A1, A2, A3 ... B1, B2, B3 ..., etc. A notation to the right of a logic box such as a B in a circle indicates that the logic box references (that is, "calls") the software of flow chart B to perform part of its computations. At the top of each chart is a START box. To the left of each START box is a list of labels of the logic boxes which call upon the logical determinations of that chart.

Figure 6:
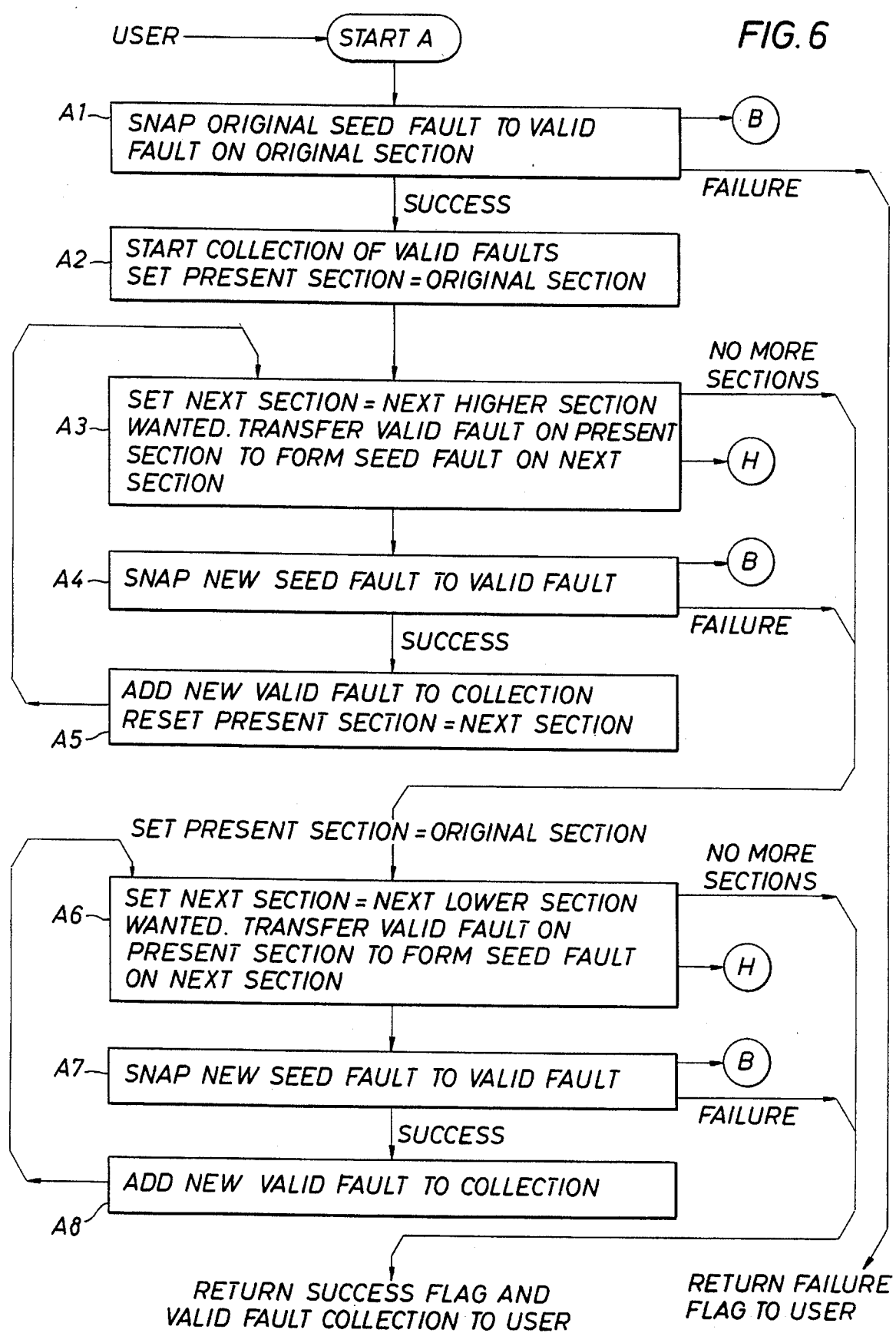
FIG. 6 is a flow chart illustrating a computer program implementation of the method of the invention for finding all valid fault curves in a three dimensional volume of seismic data.

FIG. 6 is a flow chart of software to perform the method for finding all valid fault curves for all sections of the three dimensional seismic data volume 34 (FIG. 2) from one original seed fault of one vertical section. FIG. 6 is the top level flow chart showing the process of snapping one seed fault on one section to the valid fault on that section, and then extending the determinations throughout all desired sections, both those with higher section indexes and those with lower section indexes. Often the desired sections are simply those which are offset from the original section by a constant index amount, such as every tenth section, but other specifications may be used.

The logic box A1 refers to the process of snapping a seed fault to a valid fault. Such process is performed for each section as described below.

Figure 17:
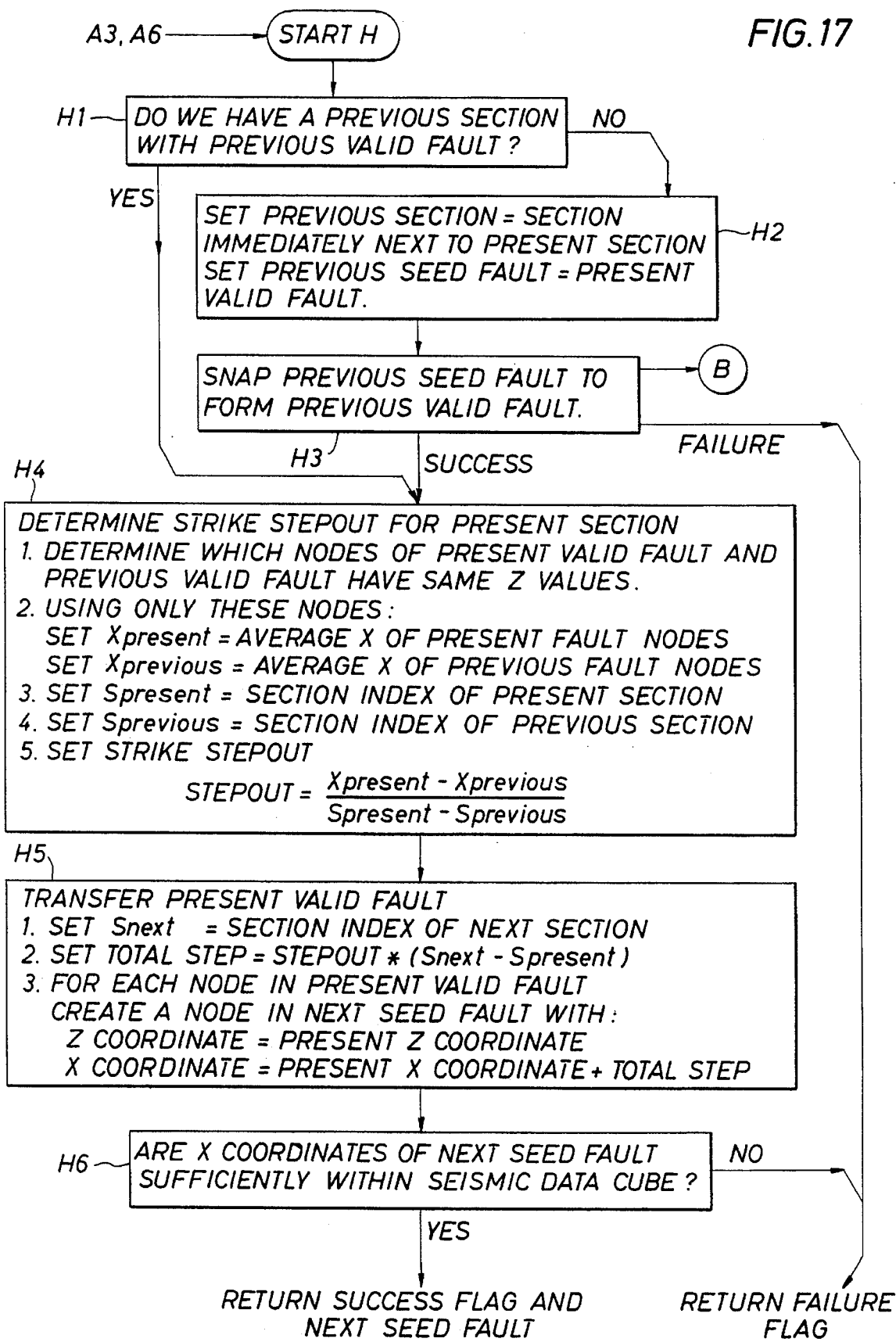
FIG. 17 is a flow chart illustrating a computer program, called by the program of FIG. 6, which implements a method for transferring a valid fault on a present seismic section to become a seed fault on another seismic section.

The process of transferring a valid fault from one section to become a seed fault on another section is detailed in FIG. 17.

If the computations proceed normally, the user receives back a set of valid fault curves, one for each section to which the process is applied to find and extend the designated fault. Such curves are displayed on monitor 24 or one of the output devices 38 such as a plotter.

Description of the Method of Snapping a Seed Fault to a Valid Fault

Figure 7:
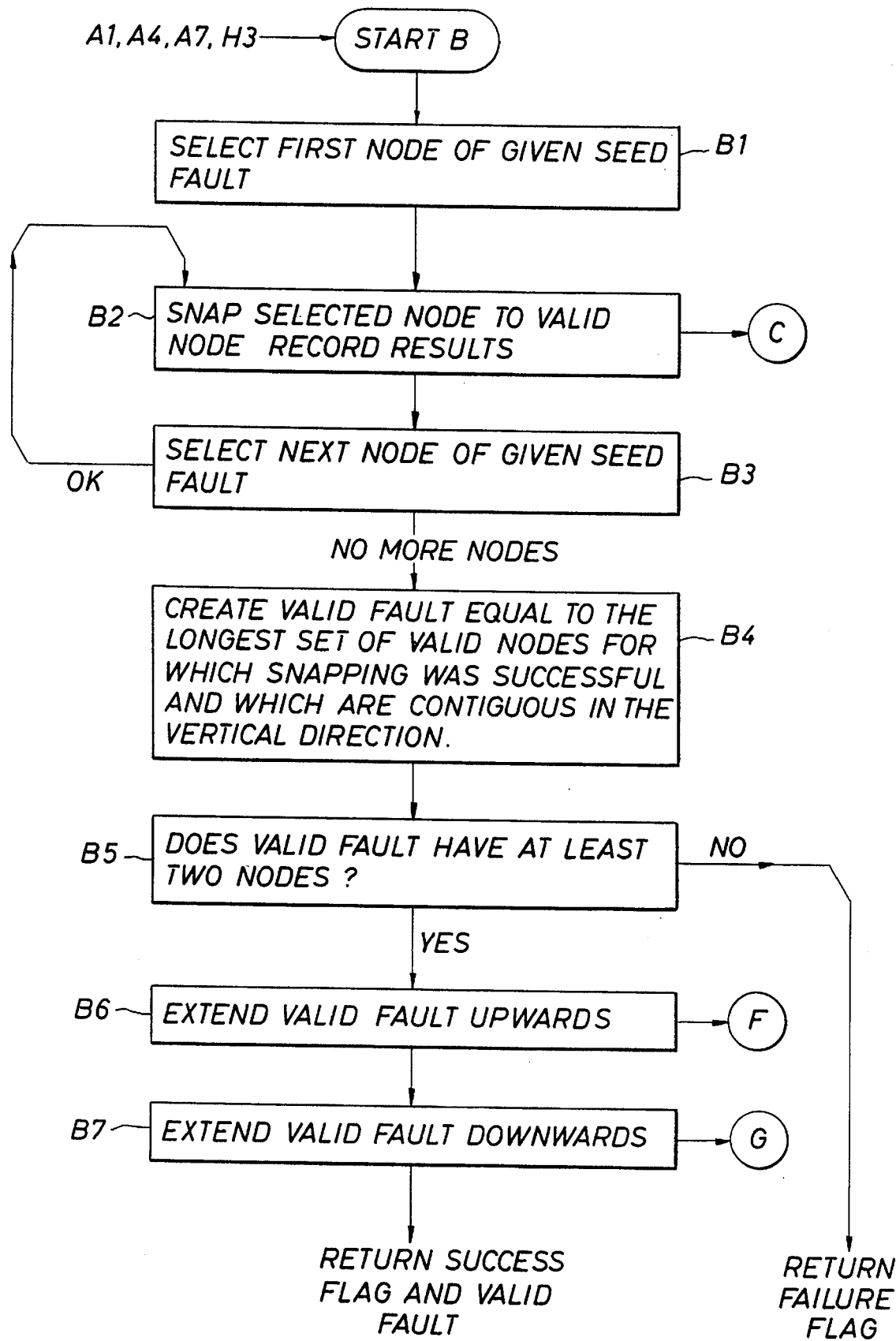
FIG. 7 is a flow chart illustrating a computer program, called by the programs of FIG. 6 and FIG. 17, which implements the method of the invention for snapping a seed node to a valid node and a seed fault to a valid fault.

FIG. 7 is a flow chart of software for the method to perform the step of snapping a seed fault to a valid fault. The input given seed fault has at least two nodes. The program takes each of these seed nodes and tries to snap it to a valid node by a process described in the flow chart of FIG. 8. If snapping succeeds for at least two consecutive nodes, then according to the preferred embodiment, a valid fault is initialized, and an attempt is made to extend it both upwards and downwards in the seismic data. The upwards extension is the subject of the flow chart of FIG. 13. The downwards extension is the subject of the flow chart of FIG. 14. If snapping succeeds, then the calling software receives back the nodes of a valid fault.

Figure 8:
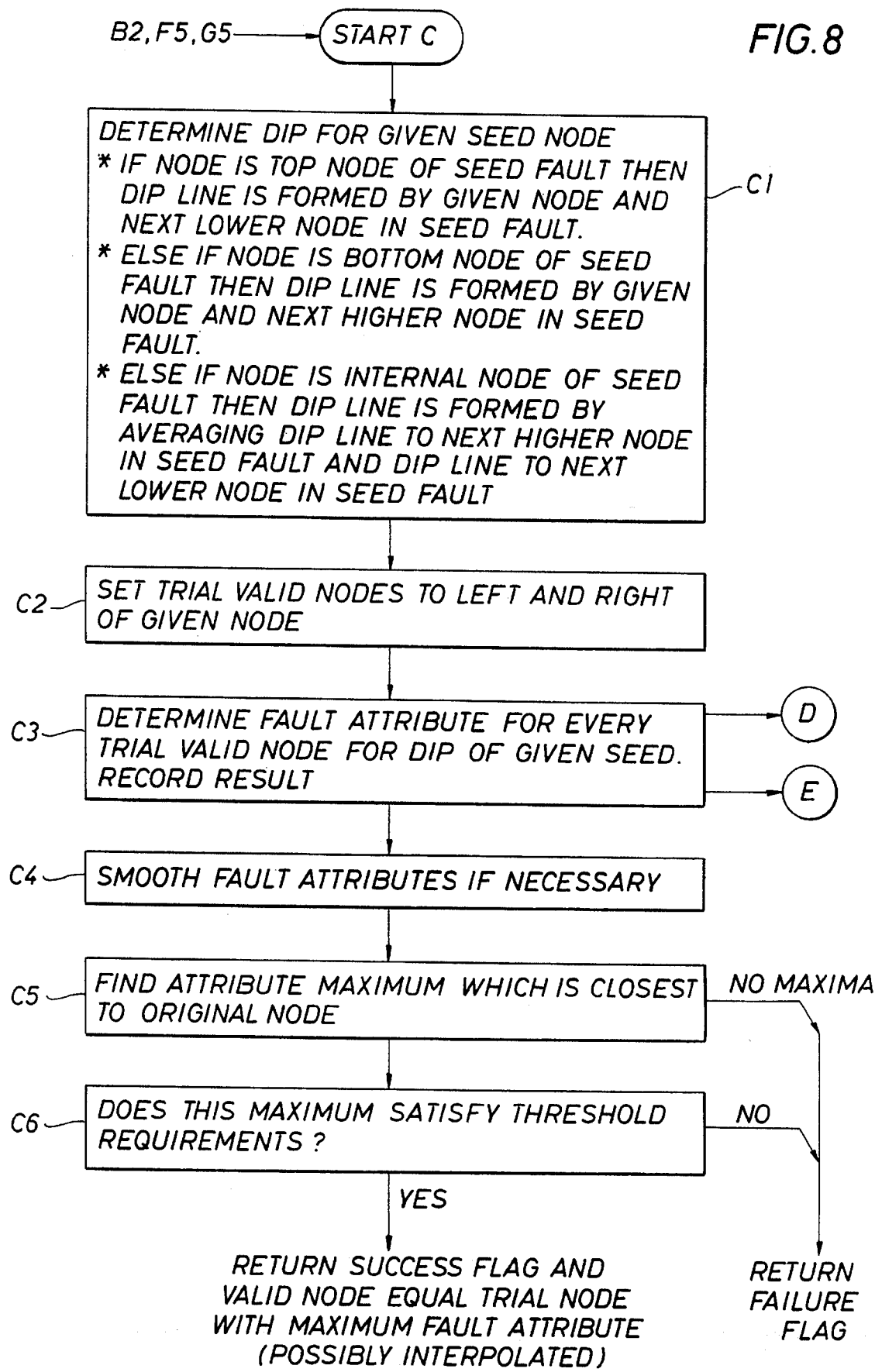
FIG. 8 is a flow chart illustrating a computer program, called by the programs of FIGS. 7, 13 and 14, which implements the method of the invention for snapping a seed node of a seed fault to a valid node.

FIG. 8 is a flow chart representation of a computer program to perform the method of snapping a given seed node of a seed fault to a valid node. Logic box C1 describes the determination of a fault dip to be associated with the designated seed node. This is accomplished using the node or nodes of the seed fault which are the neighbors of the given seed node.

The method may also be adapted to cases where only one node on the seed fault is available. Two sub-cases arise, according to whether or not dip-line information is available from some other source. In either sub-case a first estimate of a second node on the seed fault is made, and then the process proceeds as described in logic box C1 for the situation where two nodes are available.

Dip-line information might be provided directly by the user, for example in the form of the slope of the fault dip, expressed as a number of horizontal units (plus or minus) per vertical unit. For such case a second node can be found by moving upwards (or downwards) from the given node by a standard distance and then moving leftwards (or rightwards) by an amount equal to the standard distance times the given slope.

If only one node is available on the seed fault and dip-line information is not available, then a second node may be found by various trial-and-error methods. For example, along a horizontal line positioned upwards a standard distance from the given node, a plurality of trial second nodes may be created which are distributed to the left and right within some geologically reasonable horizontal window. These trial second nodes are called "trial top seed nodes", and the original seed node is designated the "bottom seed node". Each combination of a trial top seed node and the bottom seed node may be called a "trial seed fault". An attempt to snap each trial seed fault to the valid fault by the method described herein is made. The strengths of the valid faults found are recorded.

If none of these attempted snaps succeeds, then failure is reported to the user. Otherwise the method selects that particular valid fault whose strength is greatest and designates the appropriate trial second node as the true second node. This designation may be improved by well-known interpolation techniques around the trial second node. In any event, two trial nodes are now available and the method proceeds as specified in logic box C1 of FIG. 8.

Next, as specified in Logic Box C2 a set of trial valid nodes, normally equally spaced horizontally, are created in a horizontal search window around the given node. Then, for each trial node in the set, a "fault attribute" is determined assuming the constant fault dip previously determined. The particular method used for attribute determination might vary according to data circumstances.

Figure 9:
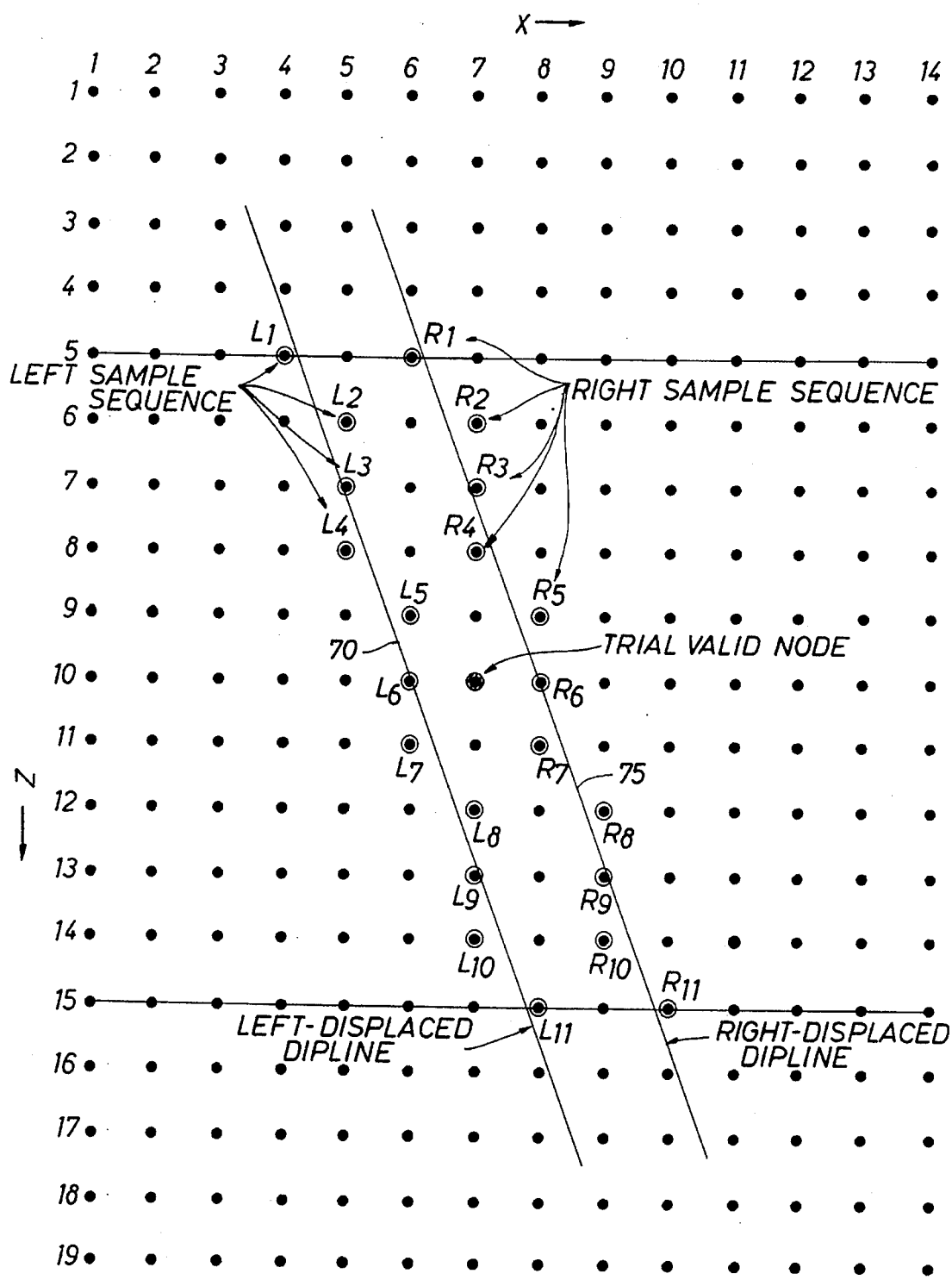
FIG. 9 is a graphical illustration of parallel dip-lines about a trial fault node useful in comparing seismic values to the left of the fault with seismic values to the right of the fault for obtaining pairs of sequences for a normalized cross-correlation process for determining a fault attribute.
Figure 10:
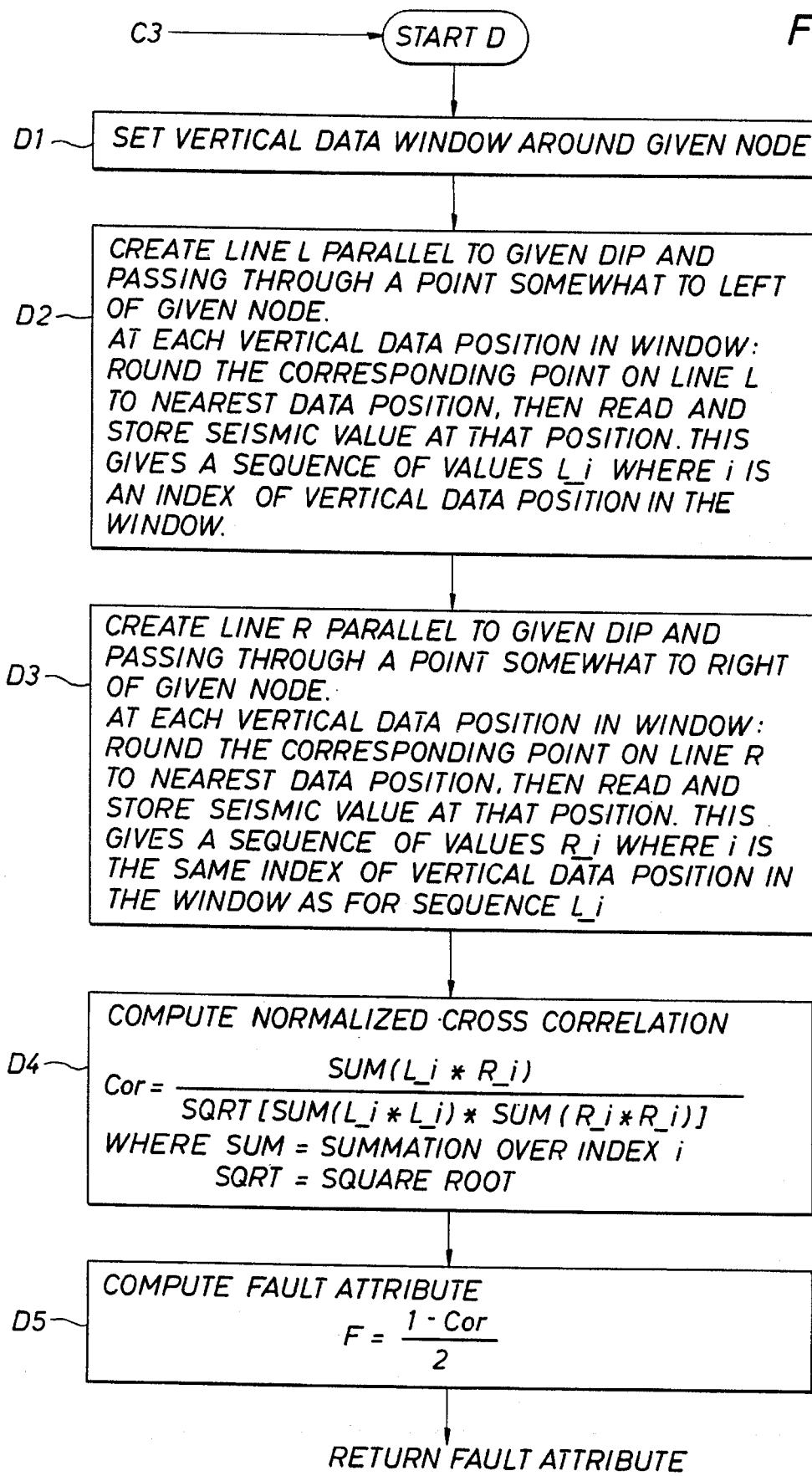
FIG. 10 is a flow chart illustrating a computer program, called by the program of FIG. 8, which implements a method for determining a fault attribute for a given node and dip by a cross-correlation technique.
Figure 11:
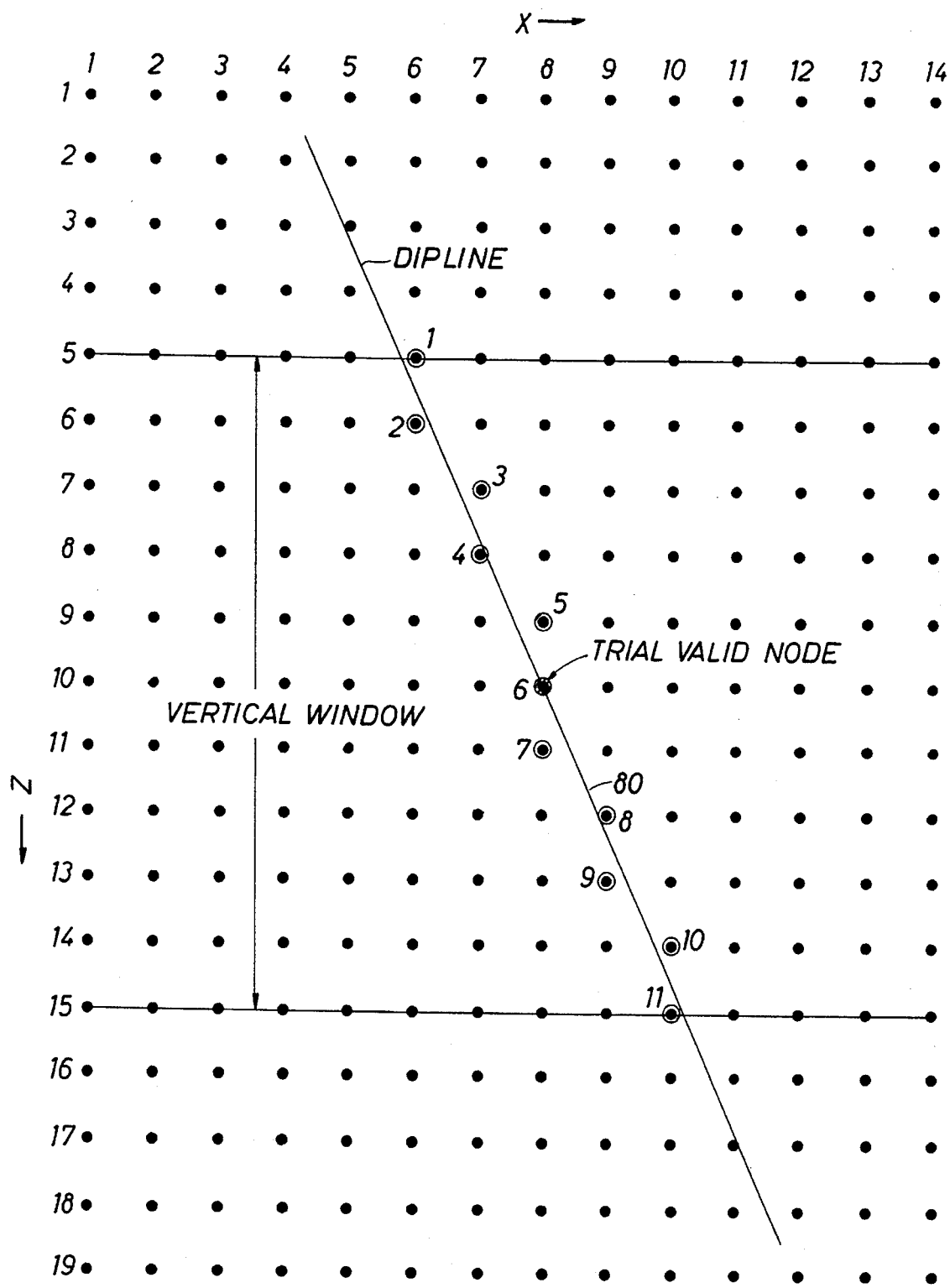
FIG. 11 is a graphical illustration of a single dip line through a trial valid node and a method for obtaining a suitable set of samples in an RMS process for determining a fault attribute.
Figure 12:
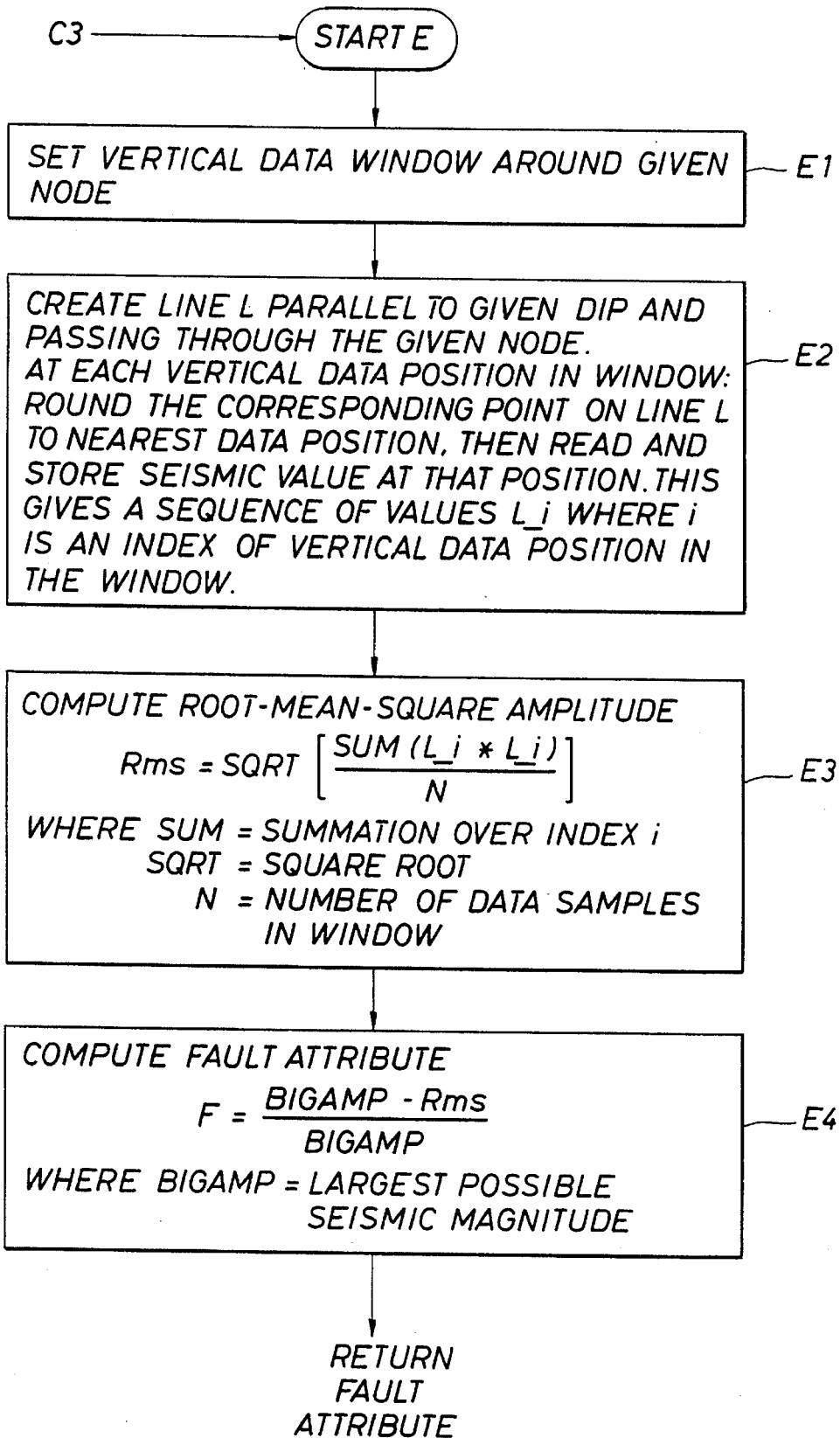
FIG. 12 is a flow chart illustrating a computer program, called by the program of FIG. 8, which implements a method for determining the fault attribute for a given node and dip by a root-mean-square (RMS) technique.

Two alternative possibilities are illustrated graphically in FIGS. 9 and 11 with computer programs to achieve such methods being detailed in the flow charts of FIGS. 10 and 12. Regardless of the particular method selected, "probability-like" values will generally vary up and down as the determination is made from one trial node to the next, with each trial node being on a horizontal line. If this oscillation is rapid, it may be necessary as indicated in Logic box C4 (FIG. 8), to smooth the attributes horizontally by standard well-known mathematical operations. Next, the (smoothed) attributes are scanned as indicated in logic box C5 for that local maximum value, if any, which is closest to (either left or right of) the given seed node. The position of this maximum attribute may be determined somewhere between the positions of the trial nodes by standard well-known interpolation methods. Interpolation, if performed, is the subject of logic box C5.

Finally, the maximum may be subjected to various thresholding tests, as indicated in logic box C6 before being accepted as defining a valid node. For example, the maximum might be required to exceed some empirically determined absolute minimum value for the particular method used for attribute determination. And/or it might be required to exceed the average computed attribute by an empirically determined amount. If such tests are passed in logic box C6, then the valid node is defined with its horizontal coordinate equal to the position of the maximum attribute value. The information as to the location of such valid node is returned to the calling software, e.g., logic box B2 of FIG. 7.

FIG. 10 is a flow chart of software to perform the method for computing the fault attribute for a given node and dip, by a normalized cross-correlation technique. The seismic patterns on two line segments are compared. The line segments are near to each other horizontally and parallel to each other and to the dip of the fault.

FIG. 9 graphically illustrates a preferred method for obtaining seismic samples "in the vicinity" of a trial valid node for a given fault dip, when a set of values to the left of the fault is to be compared with a set of values to the right of the fault. The figure shows a dip-line 70 through a node at (x,z)=(7,10), but displaced to the left one sample, and another dip-line 75 through the node but displaced to the right one sample. Each of the dip-lines 70, 75 is rounded horizontally as explained below by reference to FIG. 11 and then used to obtain one sample sequence L(i) to the left of the fault and one sample sequence R(i) to the right of the fault, as follows:

| | |
|---|---|
| L (1) = S (4, 5) | R (1) = S (6, 5) |
| L (2) = S (5, 6) | R (2) = S (7, 6) |
| L (3) = S (5, 7) | R (3) = S (7, 7) |
| L (4) = S (5, 8) | R (4) = S (7, 8) |
| L (5) = S (6, 9) | R (5) = S (8, 9) |
| L (6) = S (6, 10) | R (6) = S (8, 10) |
| L (7) = S (6, 11) | R (7) = S (8, 11) |
| L (8) = S (7, 12) | R (8) = S (9, 12) |
| L (9) = S (7, 13) | R (9) = S (9, 13) |
| L (10) = S (7, 14) | R (10) = S (9, 14) |
| L (11) = S (8, 15) | R (11) = S (10, 15) |

Where s (x, z) denotes seismic amplitude at horizontal index x and vertical index z.

These two sequences are illustrative of a suitable pair of sequences to use in the "normalized cross-correlation" algorithm for computing the fault attribute.

The sequences of FIG. 9 illustrate vicinities of the fault which are only one sample wide horizontally. One sample width illustrates the simplest situation. Clearly the sample width can be enlarged horizontally by including horizontal neighbors of the samples indicated in the sequences itemized above. When the line segments are both on the same side of the fault, the two patterns are expected to be more similar to each other than when they straddle the fault. Such lower similarity implies that a higher probability of a fault exists located midway between the lines. Similarly, by using this technique a "normalized cross-correlation", COR, is determined between the two seismic patterns. Logic boxes D1, D2, D3 and D4 of FIG. 10 explain the determination of the COR value each time the flow chart D (FIG. 10) is called by logic box D. The COR value is obtained for each trial valid node. By reversing the sign of such correlation indicator, a "dissimilarity" quantity is produced such that higher values imply a higher probability of a fault. The dissimilarity quantity is then shifted and scaled so as to force it into the range 0 to 1, thus yielding an attribute F of the "nature" or the "flavor" of a probability number. If such attribute is 1, there is a high likelihood that a fault exists at that location, and vice versa. The value of F is returned to the calling software, e.g. to logic box C3 of FIG. 8.

Many possible variations on this normalized cross-correlation algorithm, all based on the concept of measuring similarity of seismic patterns, will occur to the skilled practitioner of the seismic art.

FIG. 11 graphically illustrates and FIG. 12 presents a flow chart of software to perform the method for computing the fault attribute for a given node and dip, by a root-mean-square amplitude technique. The root-mean-square seismic amplitude, RMS is measured along a line segment parallel to the dip of the fault. In some geologic situations such an amplitude is smaller when the line is positioned on the fault than when it is positioned to either side or the fault. Consequently a lower RMS implies higher probability of a fault being located under the line. By subtracting RMS from the largest possible seismic amplitude, Bigamp, and then dividing by Bigamp, an attribute F is obtained having the desired characteristics of a fault probability with values forced to be in a range 0 to 1. The value of F is returned to the calling software.

FIG. 11 illustrates a technique to obtain seismic samples "in the vicinity" of a fault node for a given fault dip, when values which are "on" the fault are desired. The figure shows an array of dots in which horizontal position x=1 ... 12 is the seismic trace index, and vertical position z=1 ... 20 is depth (or time) sample index. The seismic data associated with the dots is denoted by S(x,z). A trial valid node is shown at position (x,z)=(8,10). The vicinity around the trial valid node is bounded vertically by a window of eleven samples extent centered on the trial valid node, and hence covering depth indexes z=5,6 ... 15. The given dip-line 80 is drawn through the trial valid node and extends up and down past the window limits. The dip-line 80 intersects the horizontal depth lines z=5,6 ... 15 at places between the dots which can be easily determined. Such intersection points are rounded to the nearest dot horizontally. Then the associated seismic values associated with each such dot is determined. Accordingly, eleven seismic values, (for an illustrative vertical height of 10 of the search window) F(i) indexed from i=1 . . . 11, representing seismic samples in a combined vertical and horizontal vicinity of the fault.

$$F(1) = S(6, 5)$$
$$F(2) = S(6, 6)$$
$$F(3) = S(7, 7)$$
$$F(4) = S(7, 8)$$
$$F(5) = S(8, 9)$$
$$F(6) = S(8, 10)$$
$$F(7) = S(8, 11)$$
$$F(8) = S(9, 12)$$
$$F(9) = S(9, 13)$$
$$F(10) = S(10, 14)$$
$$F(11) = S(10, 15)$$

These eleven samples are as directly "on" the fault as the seismic data sampling method permits for this case. It is a suitable set of samples to use in the "RMS amplitude" technique for determining a fault attribute.

Logic boxes E1, E2, E3 and E4 of FIG. 12 explain the RMS technique for obtaining attribute F for each trial valid node specified by logic box C3 of FIG. 8. Of course, the program of FIG. 8 determines which trial valid node is associated with the maximum attribute F so as to find the actual valid node.

Many possible variations of this root-mean-square amplitude algorithm, all based on the concept of measuring "magnitude" of seismic oscillation in the vicinity of a fault, will occur to the skilled practitioner of the seismic art. Furthermore, additional fault attribute algorithms based on other signature characteristics of faults, all yielding probability-like values in the range 0 to 1, will occur to the skilled practitioner of the seismic art.

Figure 13:
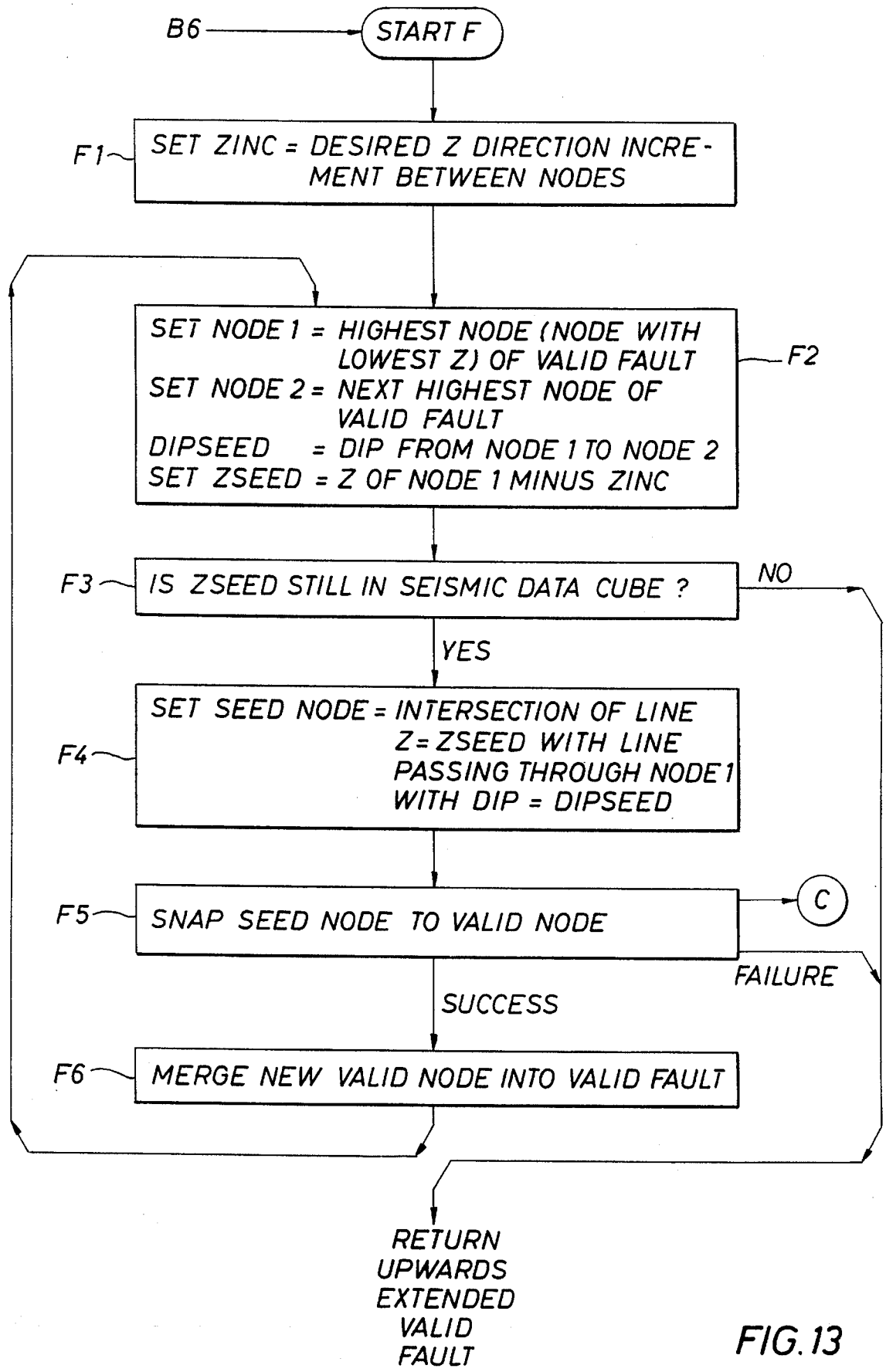
FIGS. 13 and 14 are flow charts illustrating computer programs, called respectively by the program of FIG. 7, for extending a valid fault upwards and downwards.

Description of Method for Extending a Valid Fault in a Section Upwards and Downwards FIG. 13 is a flow chart of software to perform the method for extending a valid fault upwards. It is called by logic box B6 of FIG. 7. A succession of tentative seed nodes is created at shallower and shallower depths than the top (shallowest) node of the given fault, using dip estimates based on the valid fault. Logic blocks F1 and F2 describe the method. Each such seed node is then snapped to a valid node by the process of FIG. 8, and appended, as indicated in logic box F6, to the beginning of the valid fault. Extension terminates when a new seed node is found to lie outside of the seismic data cube (logic box F3) or when snapping fails (logic box F5), whichever occurs first. The upwards extended fault is returned to the calling software (logic box B6 of FIG. 7).

Figure 14:
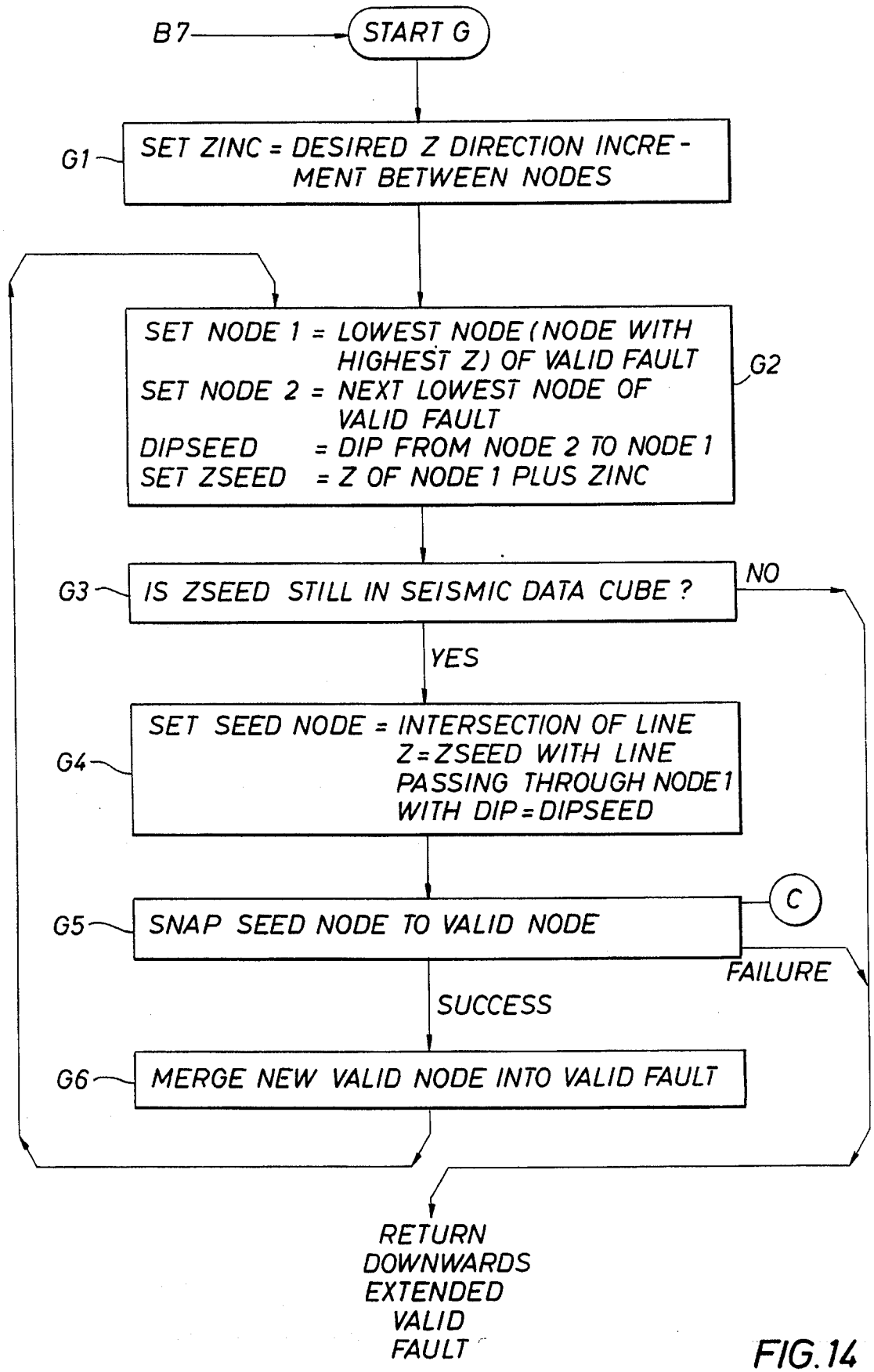

FIG. 14 is a flow chart of software to perform the method for extending a valid fault downwards. It is called by logic box B7 of FIG. 7. A succession of tentative seed nodes is created at deeper and deeper depths than the bottom (deepest) node of the given valid fault, using dip estimates based on the valid fault. Logic blocks G1 and G2 describe the method. Each such seed node is then snapped to a valid node by the process of FIG. 8, and appended to the end of the valid fault as indicated in logic box G6. Extension terminates when a new seed node is found to lie outside of the seismic data cube (logic box G3) or when snapping fails (logic box G5) whichever occurs first. The downwards extended fault is returned to the calling software.

In order to find a valid fault curve on a second vertical seismic section parallel to the present one just worked upon, but at a number of section index units a ways from it, the valid fault curve is translated to the new section. The translated curve is used as the seed fault on the new section. The method proceeds as described above to attempt to snap the new seed fault to a new valid fault curve on the new section. In snapping the nodes of the new seed fault, a horizontal uncertainty window is usually provided about each node which is somewhat larger than that used on the first section. Such enlargement reflects anticipated errors associated with the translation process. However, the translation is considered to fail if less than two vertically contiguous nodes fail to snap.

The translated fault curve is a copy of the curve onto the new section but shifted horizontally right or left on the new section according to an estimate of the "strike step-out" of the fault. The strike step-out is defined as the number of index units of horizontal shift per each section index unit away from the present section. Multiplying this step-out by the number of section index units between the present seismic section to the second seismic section indicates how much shift to make in the translation. The sign of the step-out tells whether to shift right or left.

Figure 15:
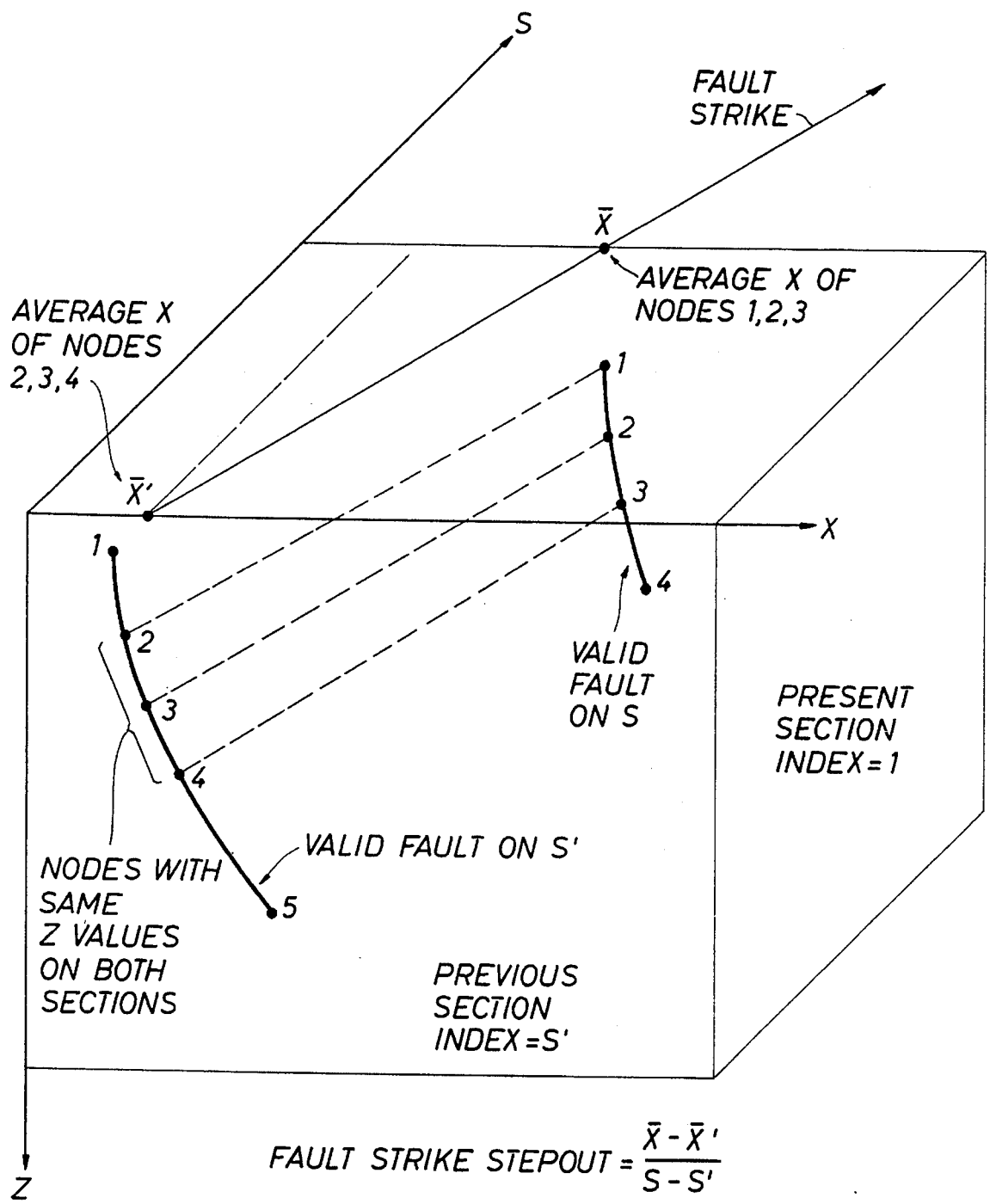
FIG. 15 is a graphical illustration of a process for estimating strike step-out from information of a valid fault curve on one seismic section and of a valid fault curve on a previous seismic section.

FIG. 15 graphically illustrates how the strike step-out is estimated once a valid fault curve on the present seismic section has been determined from the valid fault curve on a previous seismic section. The two curves are examined to discover all nodes of common z coordinates. The average x coordinates of such nodes is then computed separately for the present and previous sections. The difference between these two average x values divided by the section index difference between the two sections is then the desired estimate of strike step-out.

Description of Method for Transferring Valid Fault Curves to Other Seismic Sections in Volume FIG. 17 is a flow chart of software to perform the method for transferring a valid fault on the present seismic section to become the seed fault on the next seismic section. Logic blocks H2 and H3 of FIG. 17 describe the computerized process for selecting a valid fault of an immediately adjacent section to the one for which the seed fault has been snapped. This selection is required only one time in the process.

As seen in FIG. 15, the next adjacent section has a valid fault which is similar to the valid fault on the present section, but shifted left or right by an amount dependent on the strike step-out of the fault and the index distance between the two sections. Logic box H4 of FIG. 17 determines the strike step-out for the present section. This step-out is estimated by comparing nodes on the present valid fault with comparable nodes of a previous valid fault on a previous section. A previous valid fault is not available the first time the transfer method is called upon. In this case a previous valid fault is created on an immediately adjacent seismic section prior to estimating the step-out. In effect this creation of a previous valid fault transfers the present valid fault to the adjacent section with zero step-out and then snaps the transferred fault by the computerized process of FIG. 7. The zero step-out assumption is of minimal effect, because the distance to the adjacent section is the smallest possible (1 index unit), and will normally be completely compensated for by the snapping action. Of course this snapping might fail, in which case no step-out can be computed and the transfer fails. The transfer also fails if the horizontal shifting involved in the transfer moves too many nodes outside of the seismic data volume. Otherwise the transferred nodes comprising the seed fault on the next section is returned to the calling software.

Once a valid fault curve has been determined on the first and second seismic sections the method can be repeated in order to continue such translations throughout the seismic volume, or at least until the translation fails, either in the positive section index direction or the negative section index direction. In this process the strike step-out is re-estimated for every translation, since fault strike directions are known to change.

The strike step-out estimation for subsequent seismic sections is just a slight modification from that involved in the first translation. The fault curves from two seismic sections are compared. Again all nodes which exist on both curves at the same vertical position are found. The average horizontal position of such nodes is computed separately for both of the two curves. The difference between these two horizontal positions, divided by the section index difference between the two sections, may then be used as the estimate of strike step-out.

Figure 16:
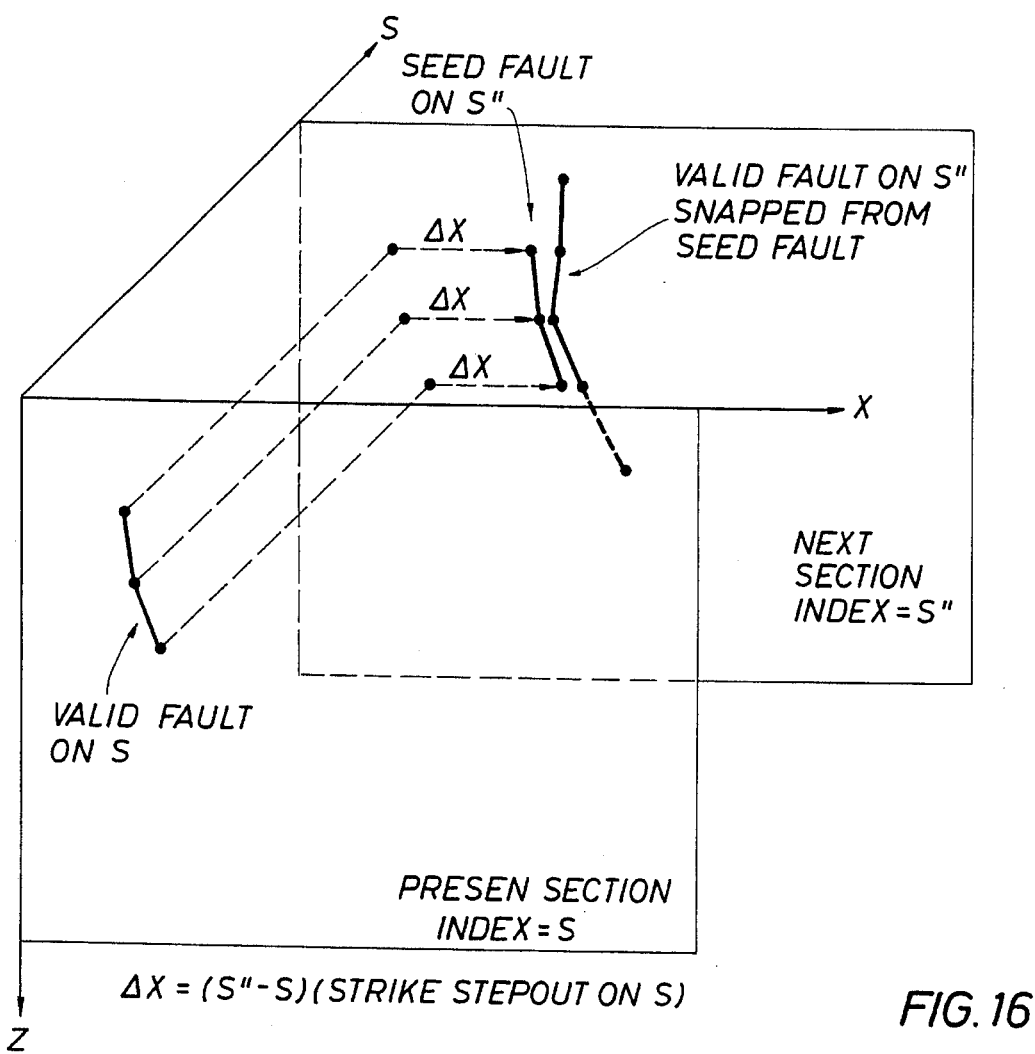
FIG. 16 is a graphical illustration of a process for transferring a valid fault from a present section to become a valid fault on another section.

FIG. 16 illustrates how a valid fault curve on the present section is transferred to one on the next section. As indicated in logic block H4, first the strike step-out is estimated from the present and previous valid fault curves as described above for FIG. 15. Then as indicated by logic block H5 the present valid fault curve is transferred to the next section by shifting all x coordinates right by an amount equal to the step-out times the section index difference to the next section. This transferred fault is used as the seed fault on the next section and is snapped to find the valid fault curve on that section. This process is then repetitive, whether higher sections are being evaluated (see logic boxes A3, A4, A5 of FIG. 6) or lower sections are being evaluated (see logic boxes A6, A7, A8 of FIG. 6).

The result of the process is a valid fault curve for each preselected vertical section of the seismic data volume 34 of memory 32. Each valid fault curve may then be displayed on monitor 24, or the fault surface defined by the fault curves of the preselected section may be displayed.

Accordingly, with the method and apparatus of this invention, an exploration professional may click on a fault that he or she observes from a vertical seismic section of a three dimensional seismic data volume. The methods of such invention then take over in order to mark a valid fault curve on that vertical seismic section and to mark each valid fault curve on each and every vertical seismic section at preselected offsets from the one that he or she observed. Furthermore, a fault surface through such volume, for the fault selected may be displayed.

While preferred embodiments of the present invention have been illustrated in detail, it is apparent that modifications and adaptations of the preferred embodiment will occur to those skilled in the art. However, such modifications and adaptations should be understood to be within the spirit and scope of the present invention as set forth in the following claims.

What is claimed is:

1. In a vertical section of seismic data values of which at least two seed nodes have been provided as a seed fault approximately defining a valid fault curve, a method for snapping a first seed node to a valid node of a valid fault curve in said section comprising the steps of:
   a) determining a dip line through said two seed nodes;
   b) setting first trial valid nodes along a first horizontal line to the left and right of said first seed node where said first horizontal line is through said first seed node;
   c) establishing a first search window of a predetermined height about said first trial valid nodes;
   d) determining a fault attribute for each one of said first trial valid nodes along a path parallel to said dip line and within said first search window;
   e) selecting a particular trial valid node having a maximum fault attribute above a predetermined threshold as a first valid node; and
   f) recording said particular trial valid node as a first valid node representing coordinates of a point on a valid fault curve in said section.

2. The method of claim 1 for further snapping a second seed node to a valid node of a valid fault curve comprising the steps of:
   g) setting trial valid nodes along a second horizontal line to the left and right of said second seed node where said second horizontal line is through said second seed node;
   h) establishing a second search window of a predetermined height about said second trial valid nodes;
   i) determining a fault attribute for each one of said second trial valid nodes along a path parallel to said dip line through such a trial valid node and within said second search window;
   j) selecting a particular trial valid node which has a maximum fault attribute above a predetermined threshold as a second valid node;
   k) determining a valid fault as a line between said first and second valid nodes; and
   l) recording said valid fault on said section.

3. The method of claim 2 for snapping said seed fault of said section to a valid fault curve of said section by further extending said valid fault curve vertically in said section comprising the steps of:
   m) extending said valid fault curve as an extension line of a line through said first valid node and said second valid node;
   n) defining a seed node at the intersection of a horizontal line established at a predetermined vertical distance from said first valid node and said extension;
   o) defining a dip line as said extension line;
   p) setting seed trial valid nodes along a seed horizontal line to the left and right of said seed node, where said seed horizontal line is through said seed node;
   q) establishing a seed search window of a predetermined height about said seed trial valid nodes;
   r) determining a fault attribute for each one of said seed trial valid nodes along a path parallel to said seed dip line through such a seed valid node and within said search window;
   t) selecting a particular seed valid node which has a maximum fault attribute above a predetermined threshold as a new first valid node;
   u) determining an extended valid fault as a line between said first valid node and said new first valid node; and
   v) recording a merged fault as a multi-line fault including said valid fault and said extended valid fault.

4. The method of claim 3 wherein
   said new first valid node and said first valid node are used as said first valid node and said second valid node of step m) and the steps of m) through v) are repeated in said section until a seed node is no longer in said section of seismic data values, or until no seed valid node has a maximum fault attribute which is above said predetermined threshold, thereby producing a valid fault in said section of seismic data values.

5. The method of claim 4 where said vertical section is one of a plurality of parallel and vertical sections of a seismic data volume and further comprising the step of translating said valid fault of said section to a second seismic section.

6. The method of claim 5 wherein said translating step includes the step of:

transferring said valid fault of said present section to a next section of said seismic value to produce a seed fault in said next section;

snapping said seed fault of said next section to produce a valid fault in said neighbor section; and for only those nodes of the next section valid fault and the present section valid fault which have the same vertical coordinates, estimating fault strike step out as the ratio of the difference between the average horizontal position of fault nodes of said valid fault of said next section and the average horizontal position of corresponding fault nodes of said present seismic section and the difference between a section index of said next section and of a section index of said present section.

7. The method of claim 6 wherein said step of translating said valid fault of said present section to a next section which differs by a predetermined difference in section index comprises the step of:

creating a seed node in a seed fault of the next section corresponding to each node in the present valid fault such that the z coordinate of each seed node equals the present z coordinate and the x coordinate of the seed node equals the present node x coordinate plus the total step out, where total step out is determined as the product of fault strike step out times the difference in the section index of the next section and the present section.

8. The method of claim 1 wherein the step of determining a fault attribute for a trial valid node along a path parallel to said dip line comprises the steps of:

creating said path as lines parallel to but displaced from said dip line to the left and to the right of said trial valid node, each of said lines being displaced from said trial valid node;

for each vertical data position of said first search window, rounding the corresponding point on said line to the left of said trial valid node to its nearest data position and reading and storing the seismic value at that position, thereby producing a sequence of values $L_i$, where i is an index of vertical data position in the first search window;

for each vertical data position of said first search window, rounding the corresponding point on said line to the right of said trial valid node to its nearest data position and reading and storing the seismic value at that position, thereby producing a sequence of values $R_i$, where i is the same index of vertical data position in the first search window as for the sequence $L_i$;

determining a normalized cross correlation index for said trial valid node as $$COR = \frac{SUM(L_i \cdot R_i)}{SQRT[SUM(L_i \cdot L_i) \cdot SUM(R_i \cdot R_i)]}$$

where

SUM=summation over index i
SQRT=SQUARE ROOT
·=Multiplication and, determining a fault attribute F for such trial valid node as $$F = \frac{1 - COR}{2}.$$

9. The method of claim 1 wherein the step of determining a fault attribute for each one of said first trial valid nodes comprises the steps of:

creating said path to be a line L parallel to said dip line and passing through one of said first trial valid nodes;

for each vertical data position in said first search window, rounding the corresponding point on line L to the nearest seismic data position and reading and storing the seismic value at a position i thereby producing a sequence of values $L_i$, where i is an index of vertical data position in said first search window, determining a Root-Mean-Square amplitude as $$RMS = SQRT \frac{[SUM(L_i \cdot L_i)]}{N}$$

where

SUM=SUMMATION OVER INDEX i
SQRT=SQUARE ROOT
N=Number of data samples in window, and
·=Multiplication determining said fault attribute as $$F = \frac{BIGAMP - RM}{BIGAMP},$$

where BIGAMP=estimate of largest possible seismic magnitude.

10. A method for automatically picking a valid fault curve of a vertical seismic section comprising the steps of:

providing user supplied information as to the coordinates of at least two seed nodes which approximately define a valid fault curve;

snapping each of said two seed nodes to valid nodes of said valid fault curve;

establishing new seed nodes by vertically extending said valid fault curve; and snapping said new nodes to an extended valid fault curve to produce a valid fault curve of said one of said vertical sections.

11. The method of claim 10, where said vertical seismic section is one of a plurality of parallel and vertical seismic sections of a seismic data volume, further comprising the steps of:

translating said nodes of said valid fault curve to another vertical section to produce seed nodes for such other vertical section; and snapping said seed nodes of such other vertical section to produce a corresponding valid fault curve for such other section.

12. The method of claim 11 further comprising the steps of:

repeating such translating and snapping steps until a plurality of valid fault curves has been determined on other sections in said seismic data volume, each of said valid fault curves corresponding to said valid fault curve of said one of said vertical sections for which a user has supplied two seed nodes.

13. Apparatus for automatically snapping a first seed node to a valid node of a valid fault curve in a vertical section of seismic data values for which at least two seed nodes have been provided as a seed fault approximately defining a valid fault curve comprising:

computer program means for determining a dip line through said two seed nodes;

computer program means for setting first trial valid nodes along a first horizontal line to the left and right of said first seed node where said first horizontal line is through said first seed node;

computer program means for establishing a first search window of a predetermined height about said first trial valid nodes;

computer program means for determining a fault attribute for each one of said first trial valid nodes along a path parallel to said dip line and within said first search window;

computer program means for selecting a particular trial valid node having a maximum fault attribute above a predetermined threshold as a first valid node; and means for recording said particular trial valid node as a first valid node representing coordinates of a point on a valid fault curve in said section.

14. The apparatus of claim 13 for further snapping a second seed node to a valid node of a valid fault curve comprising:

computer program means for setting trial valid nodes along a second horizontal line to the left and right of said second seed node where said second horizontal line is through said second seed node;

computer program means for establishing a second search window of a predetermined height about said second trial valid nodes;

computer program means for determining a fault attribute for each one of said second trial valid nodes along a path parallel to said dip line through such a trial valid node and within said second search window;

computer program means for selecting a particular trial valid node which has a maximum fault attribute above a predetermined threshold as a second valid node;

computer program means for determining a valid fault as a line between said first and second valid nodes; and means for recording said valid fault on said section.

15. The apparatus of claim 14 for snapping said seed fault of said section to a valid fault curve of said section by further extending said valid fault curve vertically in said section comprising:

computer program means for extending said valid fault curve as an extension line of a line through said first valid node and said second valid node;

computer program means for defining a seed node at the intersection of a horizontal line established at a predetermined vertical distance from said first valid node and said extension;

computer program means for defining a dip line as said extension line;

computer program means for setting seed trial valid nodes along a seed horizontal line to the left and right of said seed node, where said seed horizontal line is through said seed node;

computer program means for establishing a seed search window of a predetermined height about said seed trial valid nodes;

computer program means for determining a fault attribute for each one of said seed trial valid nodes along a path parallel to said seed dip line through such a seed valid node and within said search window;

computer program means for selecting a particular seed valid node which has a maximum fault attribute above a predetermined threshold as a new first valid node;

computer program means for determining an extended valid fault as a line between said first valid node and said new first valid node; and means for recording a merged fault as a multi-line fault including said valid fault and said extended valid fault.

16. The apparatus of claim 15 wherein said new first valid node and said first valid node are used as said first valid node and said second valid node and computer program means are provided to repeat the function of each other computer program means of claim 15 in said section until a seed node is no longer in said section of seismic data values, or until no seed valid node has a maximum fault attribute which is above said predetermined threshold, thereby producing a valid fault in said section of seismic data values.

17. The apparatus of claim 16, where said vertical seismic section is one of a plurality of parallel and vertical sections from a seismic data volume, further comprising computer program means for translating said valid fault of said section to a second seismic section.

18. The apparatus of claim 17 wherein said computer program means for translating includes computer program means for transferring said valid fault of said present section to a next section of said seismic value to produce a seed fault in said next section;

computer program means for snapping said seed fault of said next section to produce a valid fault in said neighbor section; and computer program means using only those nodes of the next section valid fault and the present section valid fault which have the same vertical coordinates, for estimating fault strike step out as the ratio of the difference between the average horizontal position of fault nodes of said valid fault of said next section and the average horizontal position of corresponding fault nodes of said present seismic section and the difference between a section index of said next section and of a section index of said present section.

19. The apparatus of claim 18 wherein said computer program means for transferring said valid fault of said present section to a next section which differs by a predetermined difference in section index comprises:

computer program means for creating a seed node in a seed fault of the next section corresponding to each node in the present valid fault such that the z coordinate of each seed node equals the present z coordinate and the x coordinate of the seed node equals the present node x coordinate plus the total step out, where total step out is determined as the product of fault strike step out times the difference in the section index of the next section and the present section.

20. The apparatus of claim 13 wherein said computer program means for determining a fault attribute for a trial valid node along a path parallel to said dip line comprises:

computer program means for creating said path as lines parallel to but displaced from said dip line to the left and to the right of said trial valid node, each of said lines being displaced from said trial valid node;

computer program means by which each vertical data position of said first search window is rounded to the corresponding point on said line to the left of said trial valid node to its nearest data position and read and stored as a seismic value at that position, thereby producing a sequence of values $L_i$, where i is an index of vertical data position in the first search window;

computer program means by which each vertical data position of said first search window is rounded to the corresponding point on said line to the right of said trial valid node to its nearest data position and read and stored as a seismic value at that position, thereby producing a sequence of values $R_i$, where i is the same index of vertical data position in the first search window as for the sequence $L_i$;

computer program means for determining a normalized cross correlation index for said trial valid node as $$COR = \frac{SUM(L_i \cdot R_i)}{SQRT[SUM(L_i \cdot L_i) \cdot SUM(R_i \cdot R_i)]}$$

where

SUM=summation over index i

SQRT=SQUARE ROOT

·=Multiplication and, computer program means for determining a fault attribute F for such trial valid node as $$F = \frac{1 - COR}{2}.$$

21. The apparatus of claim 13 wherein the computer program means for determining a fault attribute for each one of said first trial valid nodes comprises:

computer program means for creating said path to be a line L parallel to said dip line and passing through one of said first trial valid nodes;

computer program means by which each vertical data position in said first search window is rounded to the corresponding point on line L to the nearest seismic data position and storing a seismic value is read at a position i thereby producing a sequence of values $L_i$, where i is an index of vertical data position in said first search window, computer program means for determining a Root-Mean-Square amplitude as $$RMS = SQRT \frac{[SUM(L_i \cdot L_i)]}{N}$$

where

SUM=SUMMATION OVER INDEX i

SQRT=SQUARE ROOT

N=Number of data samples in window, and

·= Multiplication; and computer program means for determining said fault attribute as $$F = \frac{BIGAMP - RM}{BIGAMP},$$

where BIGAMP=estimate of largest possible seismic magnitude.

22. Apparatus for automatically picking a valid fault curve in a vertical seismic section comprising:

computer program means by which for one of said vertical sections, user supplied information is provided as to the coordinates of at least two seed nodes which approximately define a valid fault curve;

computer program means for snapping each of said two seed nodes to valid nodes of said valid fault curve;

computer program means for establishing new seed nodes by vertically extending said valid fault curve; and computer program means for snapping said new nodes to an extended valid fault curve to produce a valid fault curve of said one of said vertical sections.

23. The apparatus of claim 22, where said seismic section is one of a plurality of parallel and vertical seismic sections of a seismic data volume, further comprising:

computer program means for translating said nodes of said valid fault curve to another vertical section to produce seed nodes for such other vertical section; and computer program means for snapping said seed nodes of such other vertical section to produce a corresponding valid fault curve for such other section.

24. The apparatus of claim 23 further comprising:

computer program means for repeating such translating and snapping functions until a plurality of valid fault curves has been determined on other sections in said seismic data volume, each of said valid fault curves corresponding to said valid fault curve of said one of said vertical sections for which a user has supplied two seed nodes.

* * * * *